(12) United States Patent
Isono

(10) Patent No.: US 10,864,822 B2
(45) Date of Patent: Dec. 15, 2020

(54) VEHICLE DRIVE SYSTEM

(71) Applicant: TOYOTA JIDOSHA KABUSHIKI KAISHA, Toyota (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 15/901,109

(22) Filed: Feb. 21, 2018

(65) Prior Publication Data
US 2018/0236876 A1    Aug. 23, 2018

(30) Foreign Application Priority Data

Feb. 21, 2017 (JP) .................................. 2017-030463

(51) Int. Cl.
| | | |
|---|---|---|
| B60L 7/26 | (2006.01) | |
| F16D 65/18 | (2006.01) | |
| B60T 13/74 | (2006.01) | |
| B60T 1/06 | (2006.01) | |
| B60L 7/18 | (2006.01) | |
| B60T 8/171 | (2006.01) | |
| B60T 1/10 | (2006.01) | |
| B60T 13/66 | (2006.01) | |
| F16D 61/00 | (2006.01) | |
| B60T 8/1766 | (2006.01) | |

(Continued)

(52) U.S. Cl.
CPC .......... B60L 7/26 (2013.01); B60L 7/18 (2013.01); B60T 1/065 (2013.01); B60T 1/10 (2013.01); B60T 8/171 (2013.01); B60T 8/1766 (2013.01); B60T 8/885 (2013.01); B60T 13/662 (2013.01); B60T 13/741 (2013.01); B60T 13/746 (2013.01); F16D 61/00 (2013.01); F16D 65/18 (2013.01); B60T 2270/403 (2013.01); B60T 2270/604 (2013.01); F16D 2125/50 (2013.01); Y02T 10/72 (2013.01)

(58) Field of Classification Search
USPC ....................................................... 303/151
See application file for complete search history.

(56) References Cited

U.S. PATENT DOCUMENTS 3,507,541 A * 4/1970 Ayers, Jr. .............. B60T 13/741
 303/7
5,775,784 A    7/1998 Koga et al.
(Continued)

FOREIGN PATENT DOCUMENTS

JP    2004-351965 A    12/2004
JP    2008-228361 A    9/2008
(Continued)

*Primary Examiner* — Robert A. Siconolfi
*Assistant Examiner* — San M Aung
(74) *Attorney, Agent, or Firm* — Oliff PLC

(57) ABSTRACT

A vehicle drive system that ensures brake force in the event of failure of a brake device or a controller. In vehicle drive system, a first brake device applies a brake torque to a pair of front wheels and a second brake device applies a brake torque to a pair of rear wheels. A first brake system includes a first controller and the first brake device, and a second brake system includes a second controller and the second brake device. In the event of occurrence of failure in one of the first brake system and the second brake system, only the other brake system generates brake torque.

15 Claims, 10 Drawing Sheets

(51) Int. Cl.
*B60T 8/88* (2006.01)
*F16D 125/50* (2012.01)

(56) References Cited

U.S. PATENT DOCUMENTS

| | | | | |
|---|---|---|---|---|
| 6,749,269 | B1* | 6/2004 | Niwa | B60T 13/741 |
| | | | | 303/115.2 |
| 8,573,709 | B2* | 11/2013 | Suzuki | B60L 7/26 |
| | | | | 303/3 |
| 2003/0080614 | A1* | 5/2003 | Soga | B60K 6/44 |
| | | | | 303/152 |
| 2003/0125847 | A1* | 7/2003 | Tinskey | B60W 10/08 |
| | | | | 701/1 |
| 2004/0201270 | A1* | 10/2004 | Suzuki | B60T 13/741 |
| | | | | 303/20 |
| 2004/0256911 | A1* | 12/2004 | Hatano | B60T 8/267 |
| | | | | 303/3 |
| 2005/0284683 | A1* | 12/2005 | Matsuda | B60K 6/52 |
| | | | | 180/242 |
| 2006/0022518 | A1* | 2/2006 | Manaka | B60T 8/88 |
| | | | | 303/122 |
| 2010/0147633 | A1 | 6/2010 | Kim | |
| 2011/0320099 | A1* | 12/2011 | Kim | B60T 8/885 |
| | | | | 701/70 |

FOREIGN PATENT DOCUMENTS

| | | |
|---|---|---|
| JP | 2010-137848 A | 6/2010 |
| JP | 2015-156763 A | 8/2015 |
| WO | 96/16831 A1 | 6/1996 |

\* cited by examiner

VEHICLE DRIVE SYSTEM

CROSS REFERENCE TO RELATED APPLICATIONS

The present disclosure claims the benefit of Japanese Patent Application No. 2017-030463 filed on Feb. 21, 2017 with the Japanese Patent Office, the disclosure of which are incorporated herein by reference in its entirety.

BACKGROUND

Field of the Disclosure

Embodiments of the present application relate to the art of a drive system for vehicles comprising a plurality of brake units to apply a brake torque individually to each wheel.

Discussion of the Related Art

WO 96/16831 A1 describes a vehicle control system comprising a drive motor and a mechanical braking device. The control system taught by WO 96/16831 is configured to establish a regenerative torque by a drive motor and establish a brake torque by the mechanical braking device when a brake pedal is depressed. According to the teachings of WO 96/16831, specifically, information about an operation of the brake is transmitted to a management controller, and the regenerative torque and the brake torque are determined based on the information transmitted to the management controller with reference to a map determining a gain of the regenerative torque. In the management controller; another map in which the gain of the regenerative torque is increased is also installed, and said another map is selected in the event of failure of the mechanical brake. that is, according to the teachings of WO 96/16831, the brake torque to be established by the drive motor is increased in the event of failure of the mechanical brake.

US 2010/147633 A1 describes a brake system comprising a main brake and a sub-brake, and brake torques of those brakes are applied to a common brake disc. According to the teachings of US 2010/147633 A1, the main brake and the sub-brake are controlled by an ECU, and the sub-brake is actuated only in the event of failure of the main-brake.

US 2004/256911 A1 describes a braking device comprising a hydraulic brake and an electric brake, and torques of those brakes are applied to a common wheel. The breaking device taught by US 2004/256911 A1 is configured to equalize the brake torques of those brakes. According to the teachings of US 2004/256911 A1, therefore, the brake torque can be generated even in the event of failure of one of the brakes by the other brake.

In the vehicle described in WO 96/16831 A1, the brake torque can be generated in the event of failure of any one of the drive motor and the mechanical brake by the other one of the drive motor and the mechanical brake. According to the teachings of WO 96/16831, however, the regenerative torque and the brake torque are determined by the management controller. In the vehicle described in WO 96/16831 A1, therefore, neither of the regenerative torque nor the brake torque may be available in the event of failure of the management controller.

The brake system taught by US 2010/147633 A1 and the braking device taught by US 2004/256911 A1 may be increased in size by the brake devices arranged in parallel. In addition, unsprung load may be increased by the brake devices attached to the wheels and hence running stability may be reduced. Further, the brake forces applied to the right wheel and the left wheel may be unbalanced in the event of failure of the brake device(s).

SUMMARY

Aspects of the present disclosure have been conceived noting the foregoing technical problems, and it is therefore an object of the present disclosure is to provide a vehicle drive system that can apply brake force stably to a vehicle in the event of failure of a brake device or a controller.

According to one aspect of the present disclosure, there is provided a vehicle drive system, comprising: a first brake device that applies a brake torque to a pair of front wheels; a second brake device that applies a brake torque to a pair of rear wheels; a first controller that is configured to control the brake torque generated by the first brake device; a second controller that is configured to control the brake torque generated by the second brake device; a first brake system including the first controller and the first brake device; a second brake system including the second controller and the second brake device; and a detector that detects an occurrence of failure in the first brake system and the second brake system. In the vehicle drive system, only the brake device of the one of the first brake system and the second brake system generates the brake torque when an occurrence of failure in the other brake system is determined by the detector.

In a non-limiting embodiment, the vehicle drive system may further comprise: a first brake rotor that is connected to the pair of front wheels; a first friction brake that is brought into frictional contact to the first brake rotor to apply a brake torque to the first brake rotor; a second brake rotor that is connected to the pair of rear wheels; and a second friction brake that is brought into frictional contact to the second brake rotor to apply a brake torque to the second brake rotor. The first brake device may include the first friction brake, and the second brake device may include the second friction brake.

In a non-limiting embodiment, the vehicle drive system may further comprise: a first rotor shaft that is connected to the pair of front wheels; a first generator that translates a power generated by a rotation of the first rotor shaft into an electric power; a second rotor shaft that is connected to the pair of rear wheels; and a second generator that translates a power generated by a rotation of the second rotor shaft into an electric power. The first brake device may include the first generator; and the second brake device may include the second generator.

In a non-limiting embodiment, the vehicle drive system may further comprise: a first rotary member that is connected to the pair of front wheels; a first parking mechanism that applies a brake torque to the first rotary member to park a vehicle; a second rotary member that is connected to the pair of rear wheels; and a second parking mechanism that applies a brake torque to the second rotary member to park the vehicle. The first brake device may include the first parking mechanism, and the second brake device may include the second parking mechanism.

In a non-limiting embodiment, the vehicle drive system may further comprise: a first rotor shaft that is connected to the pair of front wheels; a first generator that translates a power generated by a rotation of the first rotor shaft into an electric power; a second rotor shaft that is connected to the pair of rear wheels; and a second generator that translates a power generated by a rotation of the second rotor shaft into an electric power. The first controller may be further configured to control the second generator and the second controller may be further configured to control the first generator.

In a non-limiting embodiment, the vehicle drive system may further comprise: a first rotary member that is connected to the pair of front wheels; a first parking mechanism that applies a brake torque to the first rotary member to park a vehicle while controlling a magnitude of the brake torque; a second rotary member that is connected to the pair of rear wheels; and a second parking mechanism that applies a brake torque to the second rotary member to park the vehicle while controlling a magnitude of the brake torque. The first controller may be further configured to control the second parking mechanism, and the second controller may be further configured to control the first parking mechanism.

In a non-limiting embodiment, the vehicle drive system may further comprise: a first differential restricting mechanism that changes a ratio between a torque delivered from the first brake device to one of the front wheels, and a torque delivered from the first brake device to the other front wheel; and a second differential restricting mechanism that changes a ratio between a torque delivered from the second brake device to one of the rear wheels, and a torque delivered from the second brake device to the other rear wheel. The first controller may be further configured to control any one of the first differential restricting mechanism and the second differential restricting mechanism, and the second controller may be further configured to control other one of the first differential restricting mechanism and the second differential restricting mechanism.

According to another aspect of the present disclosure, there is provided a vehicle drive system, comprising: a third brake device that applies a brake torque to a left front wheel; a fourth brake device that applies a brake torque to a right front wheel; a fifth brake device that applies a brake torque to a left rear wheel; a sixth brake device that applies a brake torque to a right rear wheel; a third controller that is configured to control each of the brake torque generated by the fourth brake device and the brake torque generated by the fifth brake device; a fourth controller that is configured to control each of the brake torque generated by the third brake device and the brake torque generated by the sixth brake device; a third brake system including the third controller, the fourth brake device, and the fifth brake device; a fourth brake system including the fourth controller, the third brake device, and the sixth brake device; and a detector that detects an occurrence of failure in the third brake system and the fourth brake system. In the vehicle drive system, only the brake device of the one of the third brake system and the fourth brake system generates the brake torque when an occurrence of failure in the other brake system is determined by the detector.

In a non-limiting embodiment, vehicle drive system may further comprise: a third brake rotor that is connected to the left front wheel; a fourth brake rotor that is connected to the right front wheel; a fifth brake rotor that is connected to the left rear wheel; a sixth brake rotor that is connected to the right rear wheel; a third friction brake that is brought into frictional contact to the third brake rotor to apply a brake torque to the third brake rotor; a fourth friction brake that is brought into frictional contact to the fourth brake rotor to apply a brake torque to the fourth brake rotor; a fifth friction brake that is brought into frictional contact to the fifth brake rotor to apply a brake torque to the fifth brake rotor; and a sixth friction brake that is brought into frictional contact to the sixth brake rotor to apply a brake torque to the sixth brake rotor. The third brake device may include the third friction brake, the fourth brake device may include the fourth friction brake, the fifth brake device may include the fifth friction brake, and the sixth brake device may include the sixth friction brake.

In a non-limiting embodiment, the vehicle drive system may further comprise: a third rotor shaft that is connected to the left front wheel; a fourth rotor shaft that is connected to the right front wheel; a fifth rotor shaft that is connected to the left rear wheel; a sixth rotor shaft that is connected to the right rear wheel; a third generator that translates a power generated by a rotation of the third rotor shaft into an electric power; a fourth generator that translates a power generated by a rotation of the fourth rotor shaft into an electric power; a fifth generator that translates a power generated by a rotation of the fifth rotor shaft into an electric power; and a sixth generator that translates a power generated by a rotation of the sixth rotor shaft into an electric power. The third brake device may include the third generator, the fourth brake device may include the fourth generator; the fifth brake device may include the fifth generator, and the sixth brake device may include the sixth generator.

In a non-limiting embodiment, vehicle drive system may further comprise: a third rotary member that is connected to the left front wheel; a fourth rotary member that is connected to the right front wheel; a fifth rotary member that is connected to the left rear wheel; a sixth rotary member that is connected to the right rear wheel; a third parking mechanism that applies a brake torque to the third rotary member to park a vehicle; a fourth parking mechanism that applies a brake torque to the fourth rotary member to park the vehicle; a fifth parking mechanism that applies a brake torque to the fifth rotary member to park the vehicle; and a sixth parking mechanism that applies a brake torque to the sixth rotary member to park the vehicle. The third brake device may include the third parking mechanism, the fourth brake device may include the fourth parking mechanism, the fifth brake device may include the fifth parking mechanism, and the sixth brake device may include the sixth parking mechanism.

In a non-limiting embodiment, vehicle drive system may further comprise: a third rotor shaft that is connected to the left front wheel; a fourth rotor shaft that is connected to the right front wheel; a fifth rotor shaft that is connected to the left rear wheel; a sixth rotor shaft that is connected to the right rear wheel; a third generator that translates a power generated by a rotation of the third rotor shaft into an electric power; a fourth generator that translates a power generated by a rotation of the fourth rotor shaft into an electric power; a fifth generator that translates a power generated by a rotation of the fifth rotor shaft into an electric power; and a sixth generator that translates a power generated by a rotation of the sixth rotor shaft into an electric power. The third controller may be further configured to control the third generator and the sixth generator; and the fourth controller may be further configured to control the fourth generator and the fifth generator.

In a non-limiting embodiment, vehicle drive system may further comprise: a third rotary member that is connected to the left front wheel; a fourth rotary member that is connected to the right front wheel; a fifth rotary member that is connected to the left rear wheel; a sixth rotary member that is connected to the right rear wheel; a third parking mechanism that applies a brake torque to the third rotary member to park a vehicle while controlling a magnitude of the brake torque; a fourth parking mechanism that applies a brake torque to the fourth rotary member to park the vehicle while controlling a magnitude of the brake torque; a fifth parking mechanism that applies a brake torque to the fifth rotary member to park the vehicle while controlling a magnitude of the brake torque; and a sixth parking mechanism that applies a brake torque to the sixth rotary member to park the vehicle while controlling a magnitude of the brake torque. The third controller may be further configured to control the third parking mechanism and the sixth parking mechanism, and the fourth controller may be further configured to control the fourth parking mechanism and the fifth parking mechanism.

In a non-limiting embodiment, vehicle drive system may further comprise: a third differential restricting mechanism that controls torque transmitting capacities of the third brake device and the fourth brake device; and a fourth differential restricting mechanism that controls torque transmitting capacities of the fifth brake device and the sixth brake device. The third controller may be configured to control the torque transmitting capacity of the third differential restricting mechanism, and the fourth controller may be configured to control the torque transmitting capacity of the fourth differential restricting mechanism.

In a non-limiting embodiment, vehicle drive system may further comprise: a seventh rotary member that is connected to any one of the right front wheel and the left front wheel; a seventh parking mechanism that applies a brake torque to the seventh rotary member to park the vehicle while controlling a magnitude of the brake torque; an eighth rotary member that is connected to any one of the right rear wheel and the left rear wheel; and an eighth parking mechanism that applies a brake torque to the eighth rotary member to park the vehicle while controlling a magnitude of the brake torque. Any one of the third controller and the fourth controller controlling the other one of the right front wheel and the left front wheel may control the seventh parking mechanism, and any one of the third controller and the fourth controller controlling the other one of the right rear wheel and the left rear wheel may control the eighth parking mechanism.

Thus, according to one aspect of the present disclosure, the first controller controls the pair of the front wheels, and the second controller controls the pair of the rear wheels. As described, only the brake device of the one of the first brake system and the second brake system generates the brake torque to be applied to the pair of front wheels or the pair of rear wheels in the event of failure in the other brake system. In the vehicle drive system, therefore, the brake force can be applied to the vehicle even in the event of failure of one of the brake systems while preventing a reduction in the running stability resulting from yawing or the like.

According to another aspect of the present disclosure, the third controller controls one of the diagonal pairs of wheels, and the fourth controller controls the other diagonal pairs of wheels. As described, only the brake device of the one of the third brake system and the fourth brake system generates the brake torque to be applied to one of the diagonal pairs of wheels in the event of failure in the other brake system. In the vehicle drive system, therefore, the brake force can be applied to the vehicle even in the event of failure of one of the brake systems while preventing a reduction in the running stability resulting from yawing or the like.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
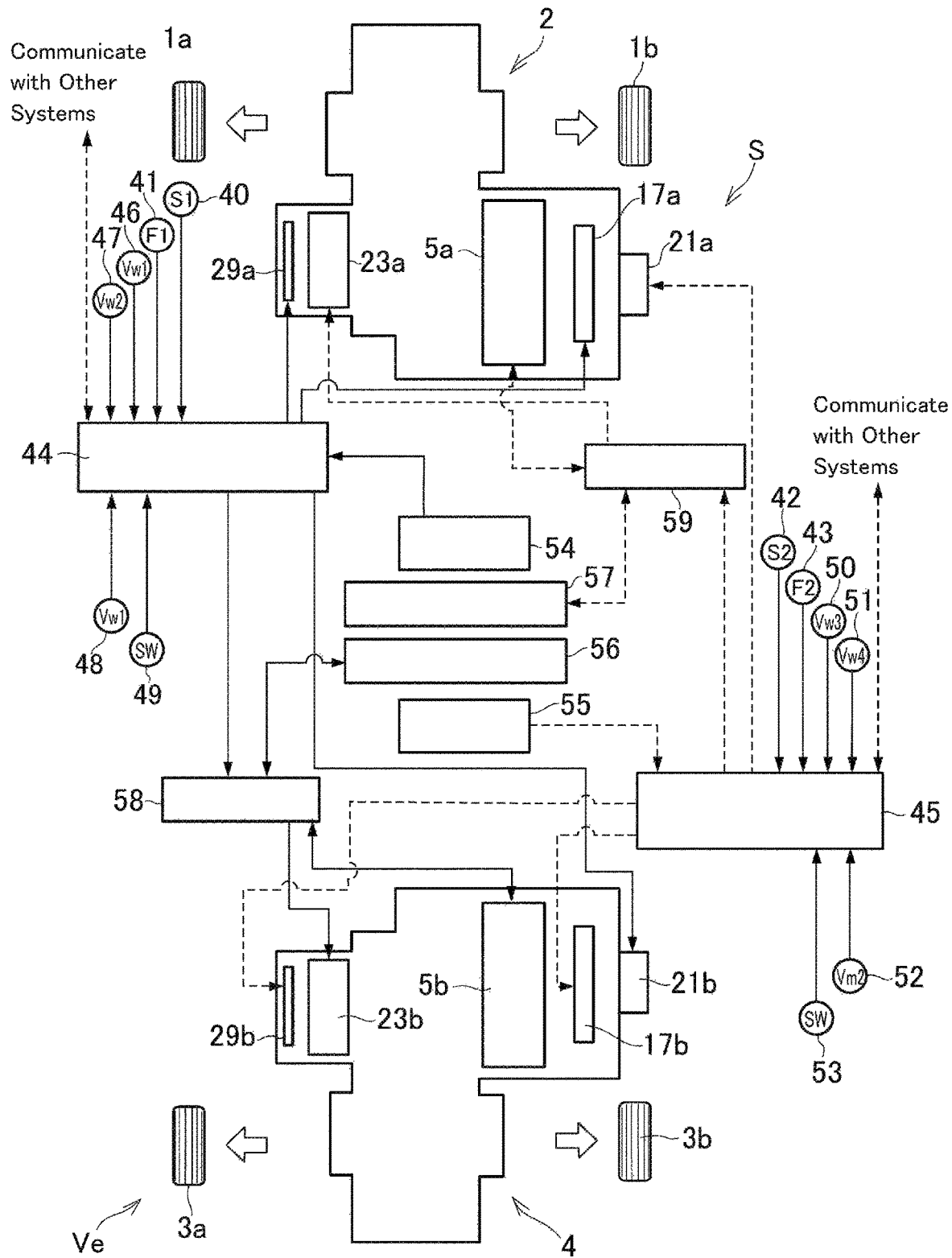
FIG. 1 is a schematic illustration showing one example of a structure of the vehicle drive system according to the embodiment of the present disclosure.

Embodiments of the present disclosure will now be explained with reference to the accompanying drawings. Referring now to FIG. 1, there is schematically shown a structure of a vehicle drive system S. The vehicle drive system S comprises: a first drive unit 2 that controls a drive force and a brake force applied to a pair of front wheels 1a and 1b; and a second drive unit 4 that controls a drive force and a brake force applied to a pair of a pair of rear wheels 3a and 3b. Here, structures of the drive units 2 and 4 are substantially identical to each other, therefore, only the structure of the first drive unit 3 will be described below and detailed explanation for the second drive unit 4 is omitted.

Figure 2:
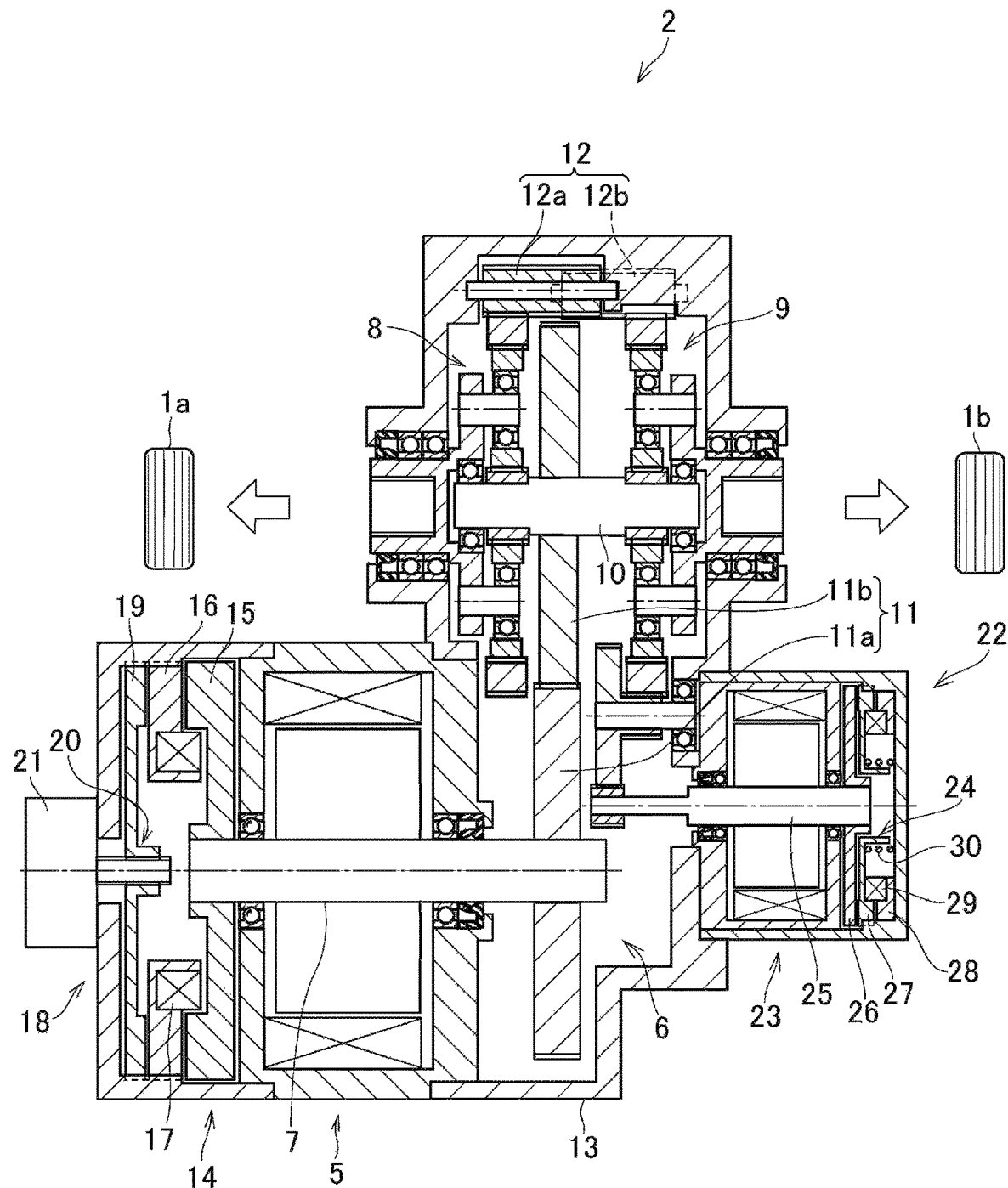
FIG. 2 is a cross-sectional view showing a cross-section of the first drive unit.

Turning to FIG. 2, there is shown a structure of the first drive unit 2. In the first drive unit 2, a drive motor 5 is connected to a transmission mechanism 6. For example, a permanent magnet synchronous motor and an induction motor may be used as the drive motor 5, and the drive motor 5 generates a drive torque and a brake torque depending on a current supply thereto. When the drive motor 5 generates the brake torque, a power of an output shaft 7 of the drive motor 5 is partially translated into an electric power depending on the brake torque and a speed of the output shaft 7, and the translated electric power is accumulated into a below-mentioned second high-voltage power supply. That is, when the drive motor 5 is operated as a generator, the brake torque is applied to the front wheels 1a and 1b through the transmission mechanism 6. Thus, the drive motor 5 may serve as a brake device. In the embodiment, accordingly, the output shaft 7 serves as a "first rotor shaft", and the drive motor 5 serves as a "first brake device" and a "first generator". In the following explanation, the drive motor 5 will also be called as the "regenerative actuator" 5.

As illustrated in FIG. 2, the power transmission mechanism 6 comprises a first planetary gear unit 8, a second planetary gear unit 9, a connection shaft 10 connecting the first planetary gear unit 8 to the second planetary gear unit 9, a gear pair 11 that transmits torque between the drive motor 5 and the connection shaft 10, and a torque reversing mechanism 12 that transmits torque between the first planetary gear unit 8 and the second planetary gear unit 9 while reversing direction of the torque. Here, structures of the first planetary gear unit 8 and the second planetary gear unit 9 are identical to each other. In the power transmission mechanism 6, a single-pinion planetary gear unit having a sun gear, a ring gear and a carrier is individually used as the first planetary gear unit 8 and the second planetary gear unit 9.

In the first planetary gear unit 8, an output torque of the drive motor 5 is applied to the sun gear through the gear pair 11 and the connection shaft 10. The ring gear of the first planetary gear unit 8 is connected to the ring gear of the second planetary gear unit 9 through the torque reversing mechanism 12, and the carrier of the first planetary gear unit 8 is connected to the left front wheel 1a. On an outer circumference of the ring gear of the first planetary gear unit 8, outer teeth are formed to be meshed with a below-mentioned first pinion 12a of the torque reversing mechanism 12.

An output torque of the drive motor 5 is also applied to the sun gear of the second planetary gear unit 9 through the gear pair 11 and the connection shaft 10. The ring gear of the second planetary gear unit 9 is connected to the ring gear of the first planetary gear unit 8 through the torque reversing mechanism 12, and the carrier of the second planetary gear unit 9 is connected to the right front wheel 1b. On an outer circumference of the ring gear of the second planetary gear unit 9, outer teeth are also formed to be meshed with a below-mentioned second pinion 12b of the torque reversing mechanism 12.

The connection shaft 10 extends parallel to an output shaft 7 of the drive motor 5 to connect the sun gear of the first planetary gear unit 8 to the sun gear of the second planetary gear unit 9. A driven gear 11b of the gear pair 11 is fitted onto an intermediate portion of the connection shaft 10.

The gear pair 11 comprises a drive gear 11a and a driven gear 11b to form a power transmission route between the output shaft 7 of the drive motor 5 and the each planetary gear unit 8, 9. The drive gear 11a is fitted onto the output shaft 7 to be rotated integrally therewith. Accordingly, the output torque of the drive motor 5 is delivered to the connection shaft 10 through the drive gear 11a and the driven gear 11b.

The torque reversing mechanism 12 comprises the first pinion 12a and the second pinion 12b to transmit torque between the ring gears of the first planetary gear unit 8 and the second planetary gear unit 9 while reversing a direction. The first pinion 12a extends parallel to the output shaft 7 and the connection shaft 10, and supported by a casing 13 of the power transmission mechanism 6 in a rotatable manner. According to the example shown in FIG. 2, a left part of the first pinion 12a is meshed with the outer teeth of the ring gear of the first planetary gear unit 8, and a right part of the first pinion 12a is meshed with a left part of the second pinion 12b. Likewise, a right part of the second pinion 12b is meshed with the outer teeth of the ring gear of the second planetary gear unit 9, and the left part of the second pinion 12b is meshed with the right part of the first pinion 12a.

In the power transmission mechanism 6, torques if the ring gears are cancelled to each other by connecting the ring gears by the torque reversing mechanism 12. In other words, the torque applied to the ring gear of the second planetary gear unit 9 counteracts to the torque applied to the ring gear of the first planetary gear unit 8, and the torque applied to the ring gear of the first planetary gear unit 8 counteracts to the torque applied to the ring gear of the second planetary gear unit 9. That is, the ring gears of the first planetary gear unit 8 and the second planetary gear unit 9 may serve individually as a reaction element so that the output torque of the drive motor 5 is distributed to the carriers of the first planetary gear unit 8 and the second planetary gear unit 9. In addition, a speed difference between the carriers may be absorbed by rotations of the first pinion 12a and the second pinion 12b. Thus, the power transmission mechanism 6 may serve as a differential mechanism.

A brake torque is applied to the output shaft 7 of the drive motor 5 by a friction brake 14. Specifically, the friction brake 14 is an electromagnetic brake that is actuated to stop a rotation of a predetermined rotary member when energized. The friction brake 14 comprises: a brake rotor 15 that is fitted onto a leading end of the output shaft 7 of the drive motor 5 to be rotated integrally therewith; an annular brake stator 16 that is splined into the casing 13 while being allowed to reciprocate in an axial direction but restricted to rotate around the output shaft 7; and a coil 17 that is attached to the brake stator 16. The coil 17 generates an electromagnetic force when energized.

Specifically, when the coil 17 is energized, the brake stator 16 is brought into frictional contact to the brake rotor 15 by magnetic attraction generated by the coil 17 to establish a brake torque for stopping the rotation of the brake rotor 15. The brake torque is delivered to the front wheels 1a and 1b through the transmission mechanism 6. Accordingly, the friction brake 14 also serves as the "first brake device" of the embodiment, and in the following explanation, the coil 17 will also be called the "frictional actuator" 17.

When the current supply to the frictional actuator 17 is stopped or interrupted, the frictional engagement between the brake stator 16 and the brake rotor 15 is maintained by a parking brake (to be abbreviated as the "EPB" hereinafter) 18 to keep stopping the rotation of the output shaft 7. The EPB 18 comprises a movable plate 19, a feed screw mechanism 20 and a brake motor 21 that actuate the feed screw mechanism 20. The feed screw mechanism 20 is adapted to translate a rotary motion of the brake motor 21 into a linear motion thereby pushing the movable plate 19 toward the brake stator 16. Specifically, the EPB 18 is adapted to push the movable plate 19 and the brake stator 16 toward the brake rotor 15 by applying a forward torque to the feed screw mechanism 20 by the brake motor 21. Consequently, the brake stator 16 is brought into frictional contact to the brake rotor 15 to halt the output shaft 7. Thus, the brake motor 21 serves as an actuator of the EPB 18, and hence the brake motor 21 will also be called the "EPB actuator" 21 in the following explanation. By contrast, the output shaft 7 is allowed to rotate by applying a reverse torque to the feed screw mechanism 20 by the brake motor 21.

Specifically, reversed efficiency of the feed screw mechanism 20 of the EPB 18 to translate the linear motion into the rotational motion is adjusted to be lower than forward efficiency to translate the rotational motion into the linear motion. According to the embodiment, therefore, the output shaft 7 may be halted by pushing the brake stator 16 toward the brake rotor 15 by the feed screw mechanism 20 even if the current supply to the frictional actuator 17 and the EPB actuator 21 is stopped. Thus, the feed screw mechanism 20 of the EPB 18 serves as a thrust force generating mechanism to convert rotary motion into linear motion to generate thrust force, and to keep stopping the rotation of the output shaft 7.

Magnitude of the brake torque applied to the output shaft 7 of the drive motor 5 may be adjusted by controlling a contact pressure between the brake stator 16 and the brake rotor 15 by the EPB actuator 21. That is, the EPB 18 may be used as a substitution of the friction brake 14. In the embodiment, accordingly, the brake rotor 15 serves as a "first rotary member", and the EPB 18 also serves as the "first brake device" and a "first parking mechanism". Here, the EPB 18 may not be integrated with the friction brake 14, and may be adapted to stop a rotation of any of the rotary members of the transmission mechanism 6.

The first drive unit 2 further comprises a differential control device 22 that controls a ratio between a torque delivered to the carrier of the first planetary gear unit 8 and a torque delivered to the carrier of the second planetary gear unit 9 from the drive motor 5.

The differential control device 22 includes a differential motor 23, and a differential restricting mechanism 24 that fix a torque distribution ratio to the carriers to "1". As the drive motor 5, a permanent magnet synchronous motor and an induction motor may be used as the differential motor 23. An output torque of the differential motor 23 is delivered to the ring gear of the second planetary gear unit 9, and a torque in the opposite direction is delivered to the ring gear of the first planetary gear unit 8 through the torque reversing mechanism 12. That is, a reaction torque of the ring gear of the first planetary gear unit 8 is reduced by generating a torque by the differential motor 23 in such a manner as to increase a reaction torque of the ring gear of the second planetary gear unit 9. Consequently, the torque distribution ratio to the carriers is changed in such a manner as to increase the torque delivered to the carrier of the second planetary gear unit 9 from the drive motor 5 is increased larger than the torque delivered to the carrier of the first planetary gear unit 8. Thus, the differential motor 23 controls a distribution ratio of the torque to the right front wheel 1a and the left front wheel 1b. In the following explanation, accordingly, the differential motor 23 will also be called the "TV actuator".

The differential restricting mechanism 24 includes: a rotary plate 26 that is fitted onto the output shaft 25 of the differential motor 23; a movable plate 27 that is engaged with an inner surface of the casing 13 while being allowed to reciprocate in an axial direction but restricted to rotate; a fixed plate 28 that is fixed to the inner surface of the casing 13 to be opposed to the movable plate 27 on the opposite side of the rotary plate 26; a coil 29 that is attached to the fixed plate 28 and that establishes magnetic attraction when energized; and a spring 30 that pushes the movable plate 27 toward the rotary plate 26.

When the coil 29 is not energized, the movable plate 27 is pushed by the spring 30 to be brought into frictional contact to the rotary plate 26 thereby applying a brake torque to the output shaft 25 of the differential motor 23. Consequently, the rotations of the ring gears of the first planetary gear unit 8 and the second planetary gear unit 9 so that the carriers of the first planetary gear unit 8 and the second planetary gear unit 9 are rotated at substantially same speeds. As a result, a differential action of the transmission mechanism 6 is restricted.

By contrast, when the coil 29 is energized, the coil 29 establishes an electromagnetic attraction. Then, when the electromagnetic attraction of the coil 29 overwhelms the elastic force of the spring 30, the movable plate 27 is isolated away from the rotary plate 26. Consequently, the differential motor 23 is allowed to rotate. In this situation, therefore, the torque distribution ratio to the carriers can be changed by controlling the differential motor 23. Thus, the coil 29 serves as an actuator of the differential restricting mechanism 24. Accordingly, in the following explanations, the coil 29 will also be called the "LSD actuator" 29.

The first drive unit 2 thus having the friction brake 14 and the EPB 18 is mounted on the vehicle Ve to serve as an inboard brake. According to the embodiment, therefore, an unsprung load of the vehicle Ve may be reduced in comparison with that in the conventional vehicle in which the brake device is attached to each front wheel. For this reason, ride comfort of the vehicle can be improved.

Figure 3:
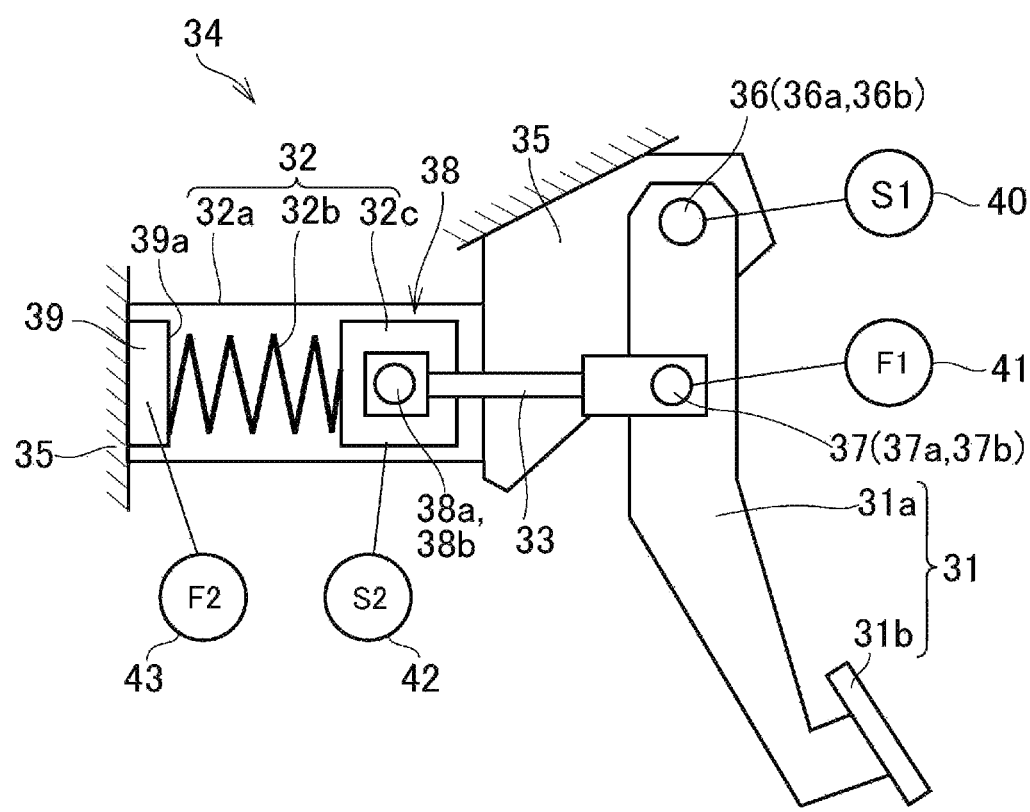
FIG. 3 is an enlarged view showing a pedal mechanism.

The friction brake 14 and the EPB 18 are manipulated in response to a control signal transmitted from the pedal mechanism 34. Turning to FIG. 3, there is shown a structure of the pedal mechanism 34 in more detail. As shown in FIG. 3, the pedal mechanism 34 comprises a brake pedal 31, a stroke simulator 32, and an operation rod 33. When the driver depresses the brake pedal 31, the pedal mechanism 34 establishes a reaction force against a pedal force to ensure a suitable brake feel.

The brake pedal 31 comprises a lever 31a, and a pedal pad 31b. The lever 31a hangs from a vehicle body 35 in a pivotal manner, and the pedal pad 31b is attached to a leading end of the lever 31a.

The brake pedal 31 further comprises a pivot point 36 at which the lever 31a is connected to the vehicle body 35, and an output member 37 attached to an intermediate portion of the lever 31a. The pivot point 36 includes a hole 36a formed on an upper end portion of the lever 31a, and a pin 36b inserted into the hole 36a to attach the lever 31a to the vehicle body 35 in a pivotal manner.

The lever 31a is connected to the operation rod 33 through the output member 37 so that a depressing force applied to the pedal pad 31b is transmitted to the operation rod 33. Specifically, the output member 37 comprises a hole 37a penetrating through the output member 37 and one end of the operation rod 33, and a pin 37b inserted into the hole 37a to attach the output member 37 and the operation rod 33 to the lever 31a. Here, the pin 37b is allowed to rotate in the hole 37a.

The stroke simulator 32 serves as a reaction force generating mechanism that generates a reaction force against the pedal force applied to the brake pedal 31 in accordance with a stroke of the brake pedal 31. The stroke simulator 32 comprises a casing 32a, an elastic member 32b, and an additional reaction force generating mechanism 32c. Specifically, the casing 32a is shaped into a cylindrical member, and the elastic member 32b, the additional reaction force generating mechanism 32c, and an after-mentioned input member 38 etc. are held in the casing 32a. In the casing 32a, the elastic member 32b such as a compressed coil spring is elastically compressed by the pedal force to establish the reaction force against the pedal force, and the brake pedal 31 is returned to an original position by the reaction force when the pedal force is eliminated. The additional reaction force generating mechanism 32c is electrically controlled to generate an electro-magnetic or frictional reaction force applied to the brake pedal 31 in addition to the reaction force generated by the elastic member 32b.

The stroke simulator 32 further comprises the input member 38 and a stationary member 39. Other end of the operation rod 33 is connected to the elastic member 32b through the input member 38 so that the pedal force applied to the brake pedal 31 is transmitted to the elastic member 32b. Specifically, the input member 38 is a piston member and the input member 38 is also held in the casing 32a. A hole 38a is formed to penetrate through the input member 38 and the other end of the operation rod 33, and a pin 38b is inserted into the hole 38a to connect the input member 38 to the operation rod 33. When the pedal force is applied to the brake pedal 31, the input member 38 is pushed by the operation rod 33 in an axial direction while compressing the elastic member 32b (e.g., to the left side in FIG. 3).

The stationary member 39 is attached to a bottom of the casing 32a, and a loading surface 39a of the stationary member 39 receives a reaction force established when the elastic member 32b is compressed. Thus, the stroke simulator 32 is fixed to the vehicle body 35 through the stationary member 39.

That is, one end of the operation rod 33 is coupled to the lever 31a and the other end of the operation rod 33 is coupled to the input member 38, so as to transmit the pedal force applied to the brake pedal 31 to the stroke simulator 32, and to transmit the reaction force established by the stroke simulator 32 against the pedal force to the brake pedal 31. Accordingly, the operation rod 33 serves as a transmission member of the embodiment.

The pedal mechanism 34 further comprises: a first stroke sensor (referred to as "S1" in FIG. 3) 40 arranged in the pivot point 36 of the brake pedal 31; a first pedal force sensor (referred to as "F1" in FIG. 3) 41 arranged in output member 37 of the brake pedal 31; a second stroke sensor (referred to as "S2" in FIG. 3) 42 arranged in the input member 38 of the stroke simulator 32; and second pedal force sensor (referred to as "F2" in FIG. 3) 43 arranged in the stationary member 39 of the stroke simulator 32.

The first stroke sensor 40 is adapted to measure a rotational angle of the pin 36b with respect to the hole 36a thereby detecting a stroke (i.e., an operating amount) of the brake pedal 31. To this end, for example, a potentiometer having a variable resistor, or a rotary encoder may be employed as the first stroke sensor 40.

The first pedal force sensor 41 is adapted to measure a load or stress acting between the hole 37a and the pin 37b of the output member 37 thereby detecting the pedal force applied to the brake pedal 31. To this end, for example, a strain gauge or a pressure-sensitive diode may be employed as the first pedal force sensor 41.

The second stroke sensor 42 is adapted to measure a displacement of the input member 38 in the casing 32a thereby detecting a stroke of the brake pedal 31b this end, for example, a potentiometer or a rotary encoder may also be employed as the second stroke sensor 42.

The second pedal force sensor 43 is adapted to measure a load or stress acting between the loading surface 39a of the stationary member 39 and the elastic member 32b thereby detecting the pedal force applied to the brake pedal 31. To this end, for example, a strain gauge, a load cell having a strain gauge, or a pressure-sensitive diode may be employed as the second pedal force sensor 43.

Detection signals of the above-mentioned sensors 40, 41, 42, and 43 are sent to a first controller (to be called the "first ECU" hereinafter) 44 and a second controller (to be called the "second ECU" hereinafter) 45. An electronic control unit configured having a microcomputer as its main constituent is individually employed as the first ECU 44 and the second ECU 45, and the first ECU 44 and the second ECU 45 are connected to each other to exchange signals therebetween.

Figure 4:
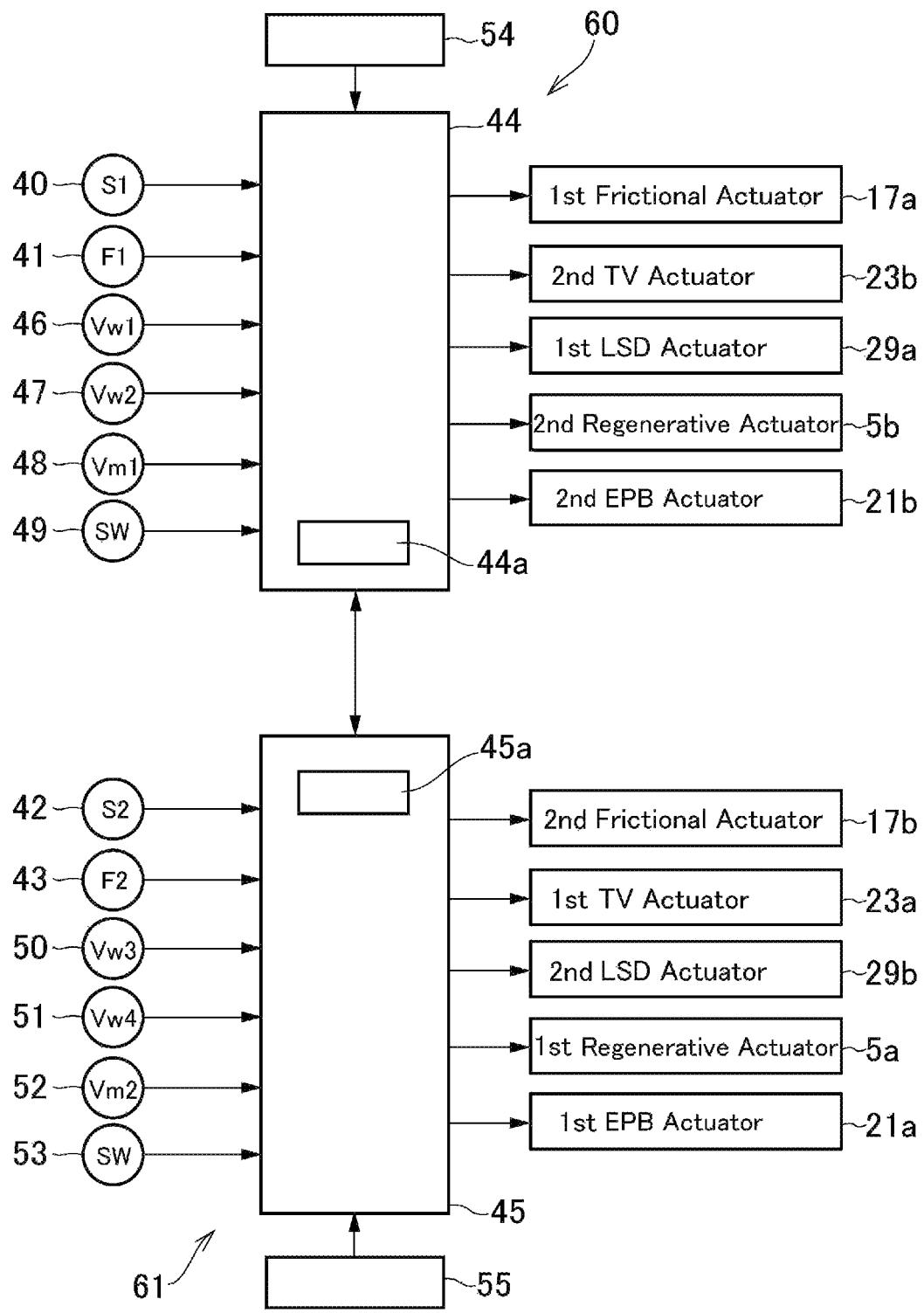
FIG. 4 is a block diagram showing functions of the first ECU and the second ECU.

Configurations of the first ECU 44 and the second ECU 45 are shown in FIG. 4 in more detail. As shown in FIG. 4, the first stroke sensor 40, the first pedal force sensor 41, a speed sensor 46 that detects a speed of the left front wheel 1a, a speed sensor 47 that detects a speed of the right front wheel 1b, a motor speed sensor 48 that detects a speed of the drive motor of the second drive unit 4, a parking range switch 49 and so on are connected to the first ECU 44. Thus, the first ECU 44 receives data about the stroke of the brake pedal 31 detected by the first stroke sensor 40, data about the pedal force applied to the brake pedal 31 detected by the first pedal force sensor 41, data about the a shift range detected by the parking range switch 49 and so on.

Likewise, the second stroke sensor 42, the second pedal force sensor 43, a speed sensor 50 that detects a speed of the left rear wheel 3a, a speed sensor 51 that detects a speed of the right rear wheel 3b, a motor speed sensor 52 that detects a speed of the drive motor 5 of the first drive unit 2, a parking brake switch 53 and so on are connected to the second ECU 45. Thus, the second ECU 45 receives data about the stroke of the brake pedal 31 detected by the second stroke sensor 42, data about the pedal force applied to the brake pedal 31 detected by the second pedal force sensor 43 and so on. The parking brake switch 53 is turned on to actuate the EPB as a parking brake.

As shown in FIGS. 1 and 4, the first ECU 44 is connected to the first drive unit 2, and the second ECU 45 is connected to the second drive unit 4. In the following explanation, the drive motor and the actuators of the first drive unit 2 will be called the "first drive motor" and the "first actuator", and "a" is allotted individually to the reference numerals of those elements. Likewise, the drive motor and the actuators of the second drive unit 4 will be called the "second drive motor" and the "second actuator", and "b" is allotted individually to the reference numerals of those elements.

The first ECU 44 is also connected to the first frictional actuator 17a, the second TV actuator 23b, the first LSD actuator 29a, the second regenerative actuator 5b, and the second EPB actuator 21b to transmit command signals to those elements. Likewise, the second ECU 45 is also connected the second frictional actuator 17b, the first TV actuator 23a, the second LSD actuator 29b, the first regenerative actuator 5a, and the first EPB actuator 21a to transmit command signals to those elements. In FIG. 1, solid lines represent connections of the first ECU 44, and dashed lines represent connections of the second ECU 45.

In order to supply electricity to the first ECU 44, the first frictional actuator 17a, and the first LSD actuator 29a, and the second EPB actuator 21b, a first power source 54 is connected to the first ECU 44. Likewise, in order to supply electricity to the second ECU 45, the second frictional actuator 17b, the second LSD actuator 29b, and the first EPB actuator 21a, a second power source 55 is connected to the second ECU 45.

The vehicle Ve is further provided with a first high-voltage power source 56 and a second high-voltage power source 57. The first high-voltage power source 56 supplies electricity to the second TV actuator 23b and the second regenerative actuator (i.e., the second drive motor) 5b, and electricity generated by the second drive motor 5b is accumulated in the first high-voltage power source 56. On the other hand, the second high-voltage power source 57 supplies electricity to the first TV actuator 23a and the first regenerative actuator (i.e., the first drive motor) 5a, and electricity generated by the first drive motor 5a is accumulated in the second high-voltage power source 57. Specifically, the first high-voltage power source 56 is connected to the second TV actuator 23b and the second drive motor 5b through a first inverter 58, and the second high-voltage power source 57 is connected to the first TV actuator 23a and the first drive motor 5a through a second inverter 59.

As described, the first ECU 44 and the second ECU 45 are connected to each other to exchange the command signal therebetween. When the brake pedal 31 is depressed during propulsion, any one of the first ECU 44 and the second ECU 45 calculates brake forces applied to the wheels 1a, 1b, 3a, and 3b based on a pedal force applied to the brake pedal 31 detected by at least one of the first pedal force sensor 41 and the second pedal force sensor 43, and a stroke of the brake pedal 31 detected by at least one of the first stroke sensor 40 and the second stroke sensor 42. Then, said any one of the first ECU 44 and the second ECU 45 calculates electric powers to be supplied to the first frictional actuator 17a, the second frictional actuator 17b, the first regenerative actuator 5a, and the second regenerative actuator 5b based on the calculated brake forces. Thereafter, the electric power is supplied to the first frictional actuator 17a, the second frictional actuator 17b, the first regenerative actuator 5a, and the second regenerative actuator 5b from the power sources 54, 55 and the high-voltage power sources 56, 57. For example, when it is necessary to differentiate the torque delivered to the left front wheel 1a and the torque delivered to the right front wheel 1b, the electric power is supplied to the first LSD actuator 29a and the first TV actuator 23a. Thus, the electric power is supplied to the LSD actuator 29a, 29b and the TV actuators 23a, 23b arbitrarily according to need.

When the parking range switch 49 is turned on to park the vehicle Ve, the electric power is supplied temporarily to the EPB actuators 21a and 21b to engage the brake stator 16 with the brake rotor 15 in the first drive unit 2, and to engage the brake stator with the brake rotor in the second drive unit 4.

That is, the brake torques applied to the wheels 1a, 1b, 3a, and 3b are established by the cooperation of the first ECU 44 and the second ECU 45.

Thus, the first pedal force sensor 41, the first stroke sensor 40, the first ECU 44, the first power source 54, the first high-voltage power source 56, the first frictional actuator 17a, the second TV actuator 23b, the first LSD actuator 29a, the second regenerative actuator 5b, and the second EPB actuator 21b form a first brake system 60. Likewise, the second pedal force sensor 43, the second stroke sensor 42, the second ECU 45, the second power source 55, the second high-voltage power source 57, the second frictional actuator 17b, the first TV actuator 23a, the second LSD actuator 29b, the first regenerative actuator 5a, and the second EPB actuator 21a form a second brake system 61.

In addition, the first ECU 44 is provided with a first detector 44a that detects an occurrence of failure in any of the elements of the second brake system 61 including the second ECU 45, and the second ECU 45 is provided with a second detector 45a that detects an occurrence of failure in any of the elements of the first brake system 60 including the first ECU 44.

Here will be explained a procedure to be carried out in the event of failure in the first brake system 60. In the event of failure of the elements in the first brake system 60 other than the first ECU 44, an occurrence of failure may be detected by the first ECU 44, and information of failure is sent from the first ECU 44 to the second ECU 45. To this end, the first ECU 44 and the second ECU 45 transmit a confirmation signal to each other so as to confirm proper operation of the destination ECU. If one of the first ECU 44 and the second ECU 45 does not receive a response from the other ECU, one of the first ECU 44 and the second ECU 45 determines occurrence of failure in the other ECU. For example, if the second ECU 45 does not receive a response from the first ECU 44, the second ECU 45 determines occurrence of failure in the first ECU 44.

Specifically, in a case that a failure occurs in the elements of the first brake system 60 other than the first ECU 44, the first ECU 44 stops operation of the first brake system 60. By contrast, in a case that a failure occurs in the first ECU 44, the elements other than the first ECU 44 may not be operated by the first ECU 44 and hence the first brake system 60 stops automatically.

In the event of failure of the first brake system 60, the second ECU 45 calculates a required brake force based on the signals transmitted from the second pedal force sensor 43 and the second stroke sensor 42, and then calculates electric powers supplied to the second frictional actuator 17b and the first regenerative actuator 5a based on the calculated required brake force. Thereafter, the calculated electric powers are supplied to the second frictional actuator 17b and the first regenerative actuator 5a from the second power source 55 and the second high-voltage power source 57. In this case, the electric power may also be supplied to the first EPB actuator 21a instead of the first regenerative actuator 5a. Further, the electric power may also be supplied to the first regenerative actuator 5a and the first EPB actuator 21a. This is because the EPB 18 serves as a backup of the friction brake 14.

When the second frictional actuator 17b is energized, the friction brake of the second drive unit 4 is actuated to apply the brake torque individually to the left rear wheel 3a and the right rear wheel 3b. On the other hand, when the electric power is supplied to the first regenerative actuator 5a, the drive motor 5 of the first drive unit 2 generates a brake torque to halt the left front wheel 1a and the right front wheel 1b.

In this situation, if it is necessary to control a ratio of the torques delivered to the left front wheel 1a and the right front wheel 1b, the second ECU 45 calculates an electric power supplied to the first TV actuator 23a in accordance with a desired ratio, and the calculated electric power is supplied to the first TV actuator 23a from the second high-voltage power source 57.

In the differential restricting mechanism 24, a frictional brake torque is applied to the rotary plate 26 by causing the rotary plate 26 to slip on the movable plate 27. By thus applying the brake torque to the rotary plate 26, a reaction torque of the second planetary gear unit 9 is decreased and a reaction torque of the first planetary gear unit 8 is increased. Specifically, a ratio of the torques delivered to the left and the right wheel can be altered by controlling the electric power supplied to the LSD actuator 29 to control a friction between the rotary plate 26 and the movable plate 27. That is, same action can be achieved as the case of controlling the TV actuator 23. Likewise, if it is necessary to control a ratio of the torques delivered to the left rear wheel 3a and the right rear wheel 3b, the second ECU 45 calculates an electric power supplied to the second LSD actuator 29b in accordance with a desired ratio, and the calculated electric power is supplied to the second LSD actuator 29b from the second power source 55. To this end, the second ECU 45 may be connected to any one of the first TV actuator 23a to control the torque ratio of the left front wheel 1a and the right front wheel 1b, and the second LSD actuator 29b to control the torque ratio of the left rear wheel 3a and the right rear wheel 3b.

Thus, the vehicle drive system according to the embodiment comprises the separate brake systems in the first drive unit 2 to apply the brake torques to the left front wheel 1a and the right front wheel 1b, and in the second drive unit 4 to apply the brake torques to the left rear wheel 3a and the right rear wheel 3b. According to the embodiment, for example, the brake torques can be applied to the left rear wheel 3a and the right rear wheel 3b by actuating the second frictional actuator 17b of the second brake system 61 in the event of failure of the first brake system 60. For this reason, the brake force applied to the vehicle Ve can be ensured even in the event of failure of one of the brake systems while preventing a reduction in the running stability resulting from yawing caused by difference in the brake torques applied to the left wheel and the right wheel.

That is, according to the embodiment, the brake force applied to the vehicle Ve can be ensured while maintaining the running stability even if the LSD actuator 29 or the TV actuator 23 is omitted. According to the embodiment, therefore, the "first brake device" and the "second brake device" should not be limited to the device having a function to control the torque ratio between the left wheel and the right wheel such as the LSD actuator 29 and the TV actuator 23. In addition, the above-explained advantages can be achieved by a drive unit having only one of the friction brake 14, the drive motor 5, and the EPB 18. In other words, the "first brake device" and the "second brake device" do not have to have all of the friction brake 14, the drive motor 5, and the EPB 18. Further, in the vehicle in which each right and left wheel is individually provided with a brake device to apply brake torque individually thereto, the above-explained advantages may also be achieved by connecting the first ECU 44 to the brake devices to apply brake torques to the left front wheel 1a and the right front wheel 1b, and by connecting the second ECU 45 to the brake devices to apply brake torques to the left rear wheel 3a and the right rear wheel 3b. That is, the "first brake device" and the "second brake device" should not be limited to the brake device adapted to apply brake torque to both of the right wheel and the left wheel.

As described, the second ECU 45 is connected to the first regenerative actuator 5a and the second EPB actuator 21a so that the brake torque can be applied individually to the left front wheel 1a and the right front wheel 1b, and the left rear wheel 3a and the right rear wheel 3b. According to the embodiment, therefore, greater brake torque can be established in comparison with that of the case in which the brake torque is applied only to the left front wheel 1a and the right front wheel 1b, even in the event of failure of one of the brake systems.

The second ECU 45 is also connected to the second LSD actuator 29b and the first TV actuator 23a. According to the embodiment, therefore, the torque distribution ratio to the left front wheel 1a and the right front wheel 1b, and the torque distribution ratio to the left rear wheel 3a and the right rear wheel 3b can be controlled during propulsion while operating only the second brake system 61. For this reason, it is possible to prevent reduction in the turning performance and the running stability even if any of the wheels slips.

Thus, in the foregoing embodiment, the brake torque is applied to the front wheels 1a, 1b, or the rear wheels 3a, 3b by one of the brake system 60 and 61 to maintain running stability, in the event of failure of the other brake system 60 or 61. However, an occurrence of yawing can be prevented in the event of failure of one of the brake systems 60 and 61 by equalizing the brake torques applied to the right wheels and the left wheels 1b this end, the brake torques may also be applied only to the left front wheel 1a and the right rear wheel 3b, or to the right front wheel 1b and the left rear wheel 3a by one of the brake systems 60 and 61, in the event of failure of the other brake system 60 or 61.

Figure 5:
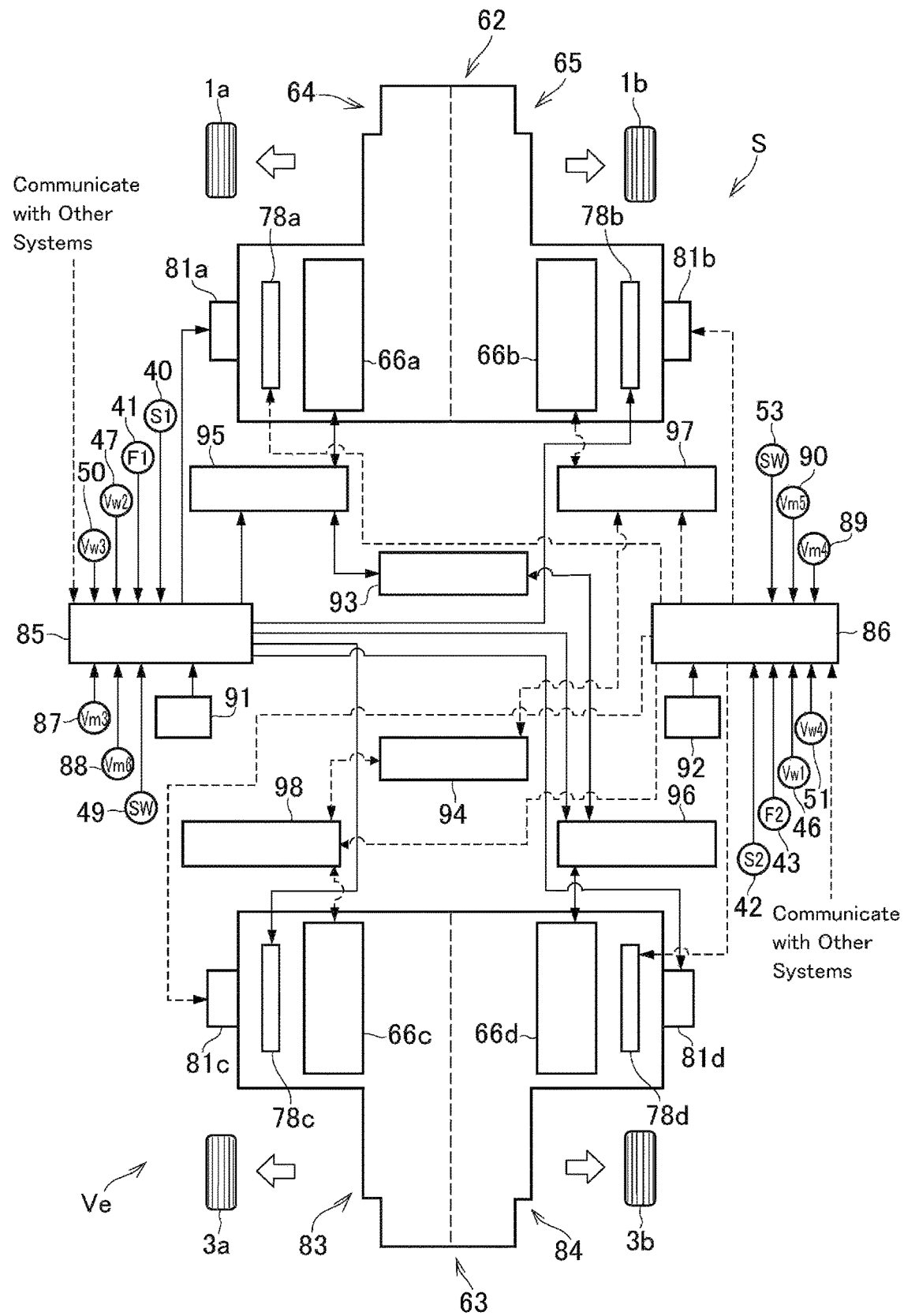
FIG. 5 is a schematic illustration showing another example of a structure of the vehicle drive system according to the embodiment of the present disclosure.

An example of such brake system is shown in FIG. 5. The system shown in FIG. 5 also comprises a unit 62 to apply brake torque to the pair of front wheels 1a, 1b, and a unit 63 to apply brake torque to the pair of rear wheels 3a, 3b. Here, structures of the units 62 and 63 are substantially identical to each other and the structure of the unit 62 that applies the brake torque to the front wheels 1a and 1b is shown in FIG. 6.

Figure 6:
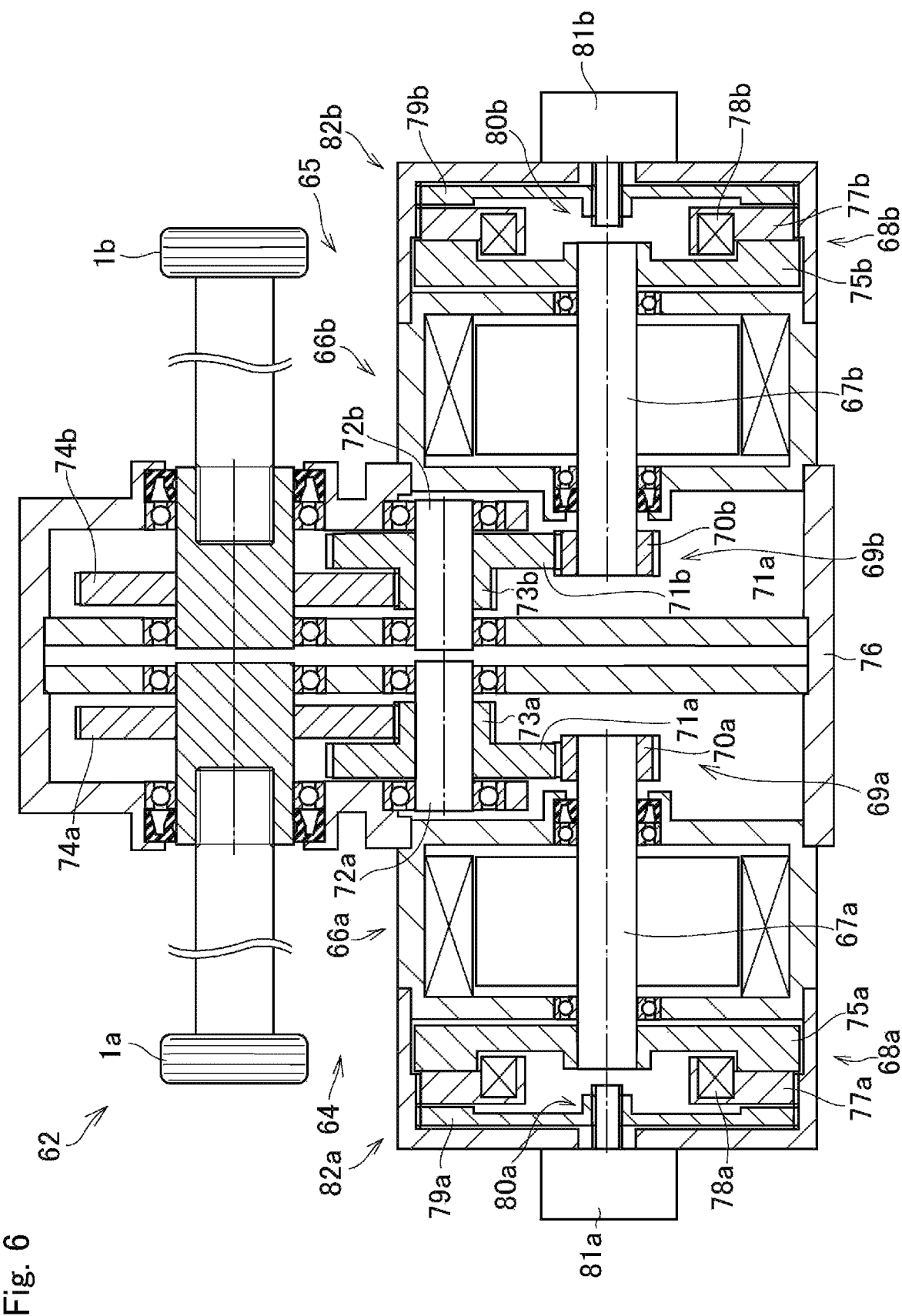
FIG. 6 is a cross-sectional view showing a cross-section of the third drive unit and the fourth drive unit.

The unit 62 shown in FIG. 6 comprises a third drive unit 64 and a fourth drive unit 65 arrange symmetrically with respect to the width center of the vehicle Ve. In the following explanation, only the structure of the third drive unit 64 situated in the left side of FIG. 6 will be explained, and the explanation for the fourth drive unit 65 will be omitted. In FIG. 6, "a" is allotted individually to the reference numerals of the elements of the third drive unit 64, and "b" is allotted individually to the reference numerals of the elements of the fourth drive unit 65.

The third drive unit 64 comprises a third drive motor 66a, a third friction brake 68a that applies a brake torque to an output shaft 67a of the third drive motor 66a, and a third power transmission mechanism 69a that delivers a torque of the third drive motor 66a to the left front wheel 1a.

For example, a permanent magnet synchronous motor and an induction motor may also be used as the third drive motor 66a, and the third drive motor 66a generates a drive force and a brake force depending on a current supply thereto. When the third drive motor 66a is operated as a generator, a brake torque is applied to the left front wheel 1a through the third power transmission mechanism 69a. Accordingly, in the embodiment, the output shaft 67a of the third drive motor 66a serves as a "third rotor shaft", and the third drive motor 66a serves as a "third brake device" and a "third generator". In the following explanation, the third drive motor 66a will also be called the "third regenerative actuator" 66a.

The output shaft 67a of the third drive motor 66a penetrates through the third drive motor 66a in the width direction of the vehicle Ve. A third output gear 70a is fitted onto a laterally inner end of the output shaft 67a, and a third countershaft 72a extends parallel to the output shaft 67a. A third driven gear 71a that is diametrically larger than the third output gear 70a is fitted onto a laterally outer portion of the third countershaft 72a while being meshed with the third output gear 70a, and a third pinion gear 73a that is diametrically smaller than the third driven gear 71a is also fitted onto a laterally inner portion of the third countershaft 72a to be meshed with a third final reduction gear 74a that is diametrically larger than the third pinion gear 73a. A torque of the third final reduction gear 74a is delivered to the left front wheel 1a. Thus, the third power transmission mechanism 69a as a final reduction unit comprises the third output gear 70a, third driven gear 71a, the third countershaft 72a, the third pinion gear 73a, and the third final reduction gear 74a.

A third brake rotor 75a is fitted onto laterally outer end of the output shaft 67a. An annular third brake stator 77a is splined into a casing 76 while being allowed to reciprocate in an axial direction but restricted to rotate around the output shaft 67a, and a coil 78a is attached to the third brake stator 77a. Specifically, when the coil 78a is energized, the third brake stator 77a is brought into frictional contact to the third brake rotor 75a by magnetic attraction generated by the coil 78a to establish a brake torque for stopping the rotation of the third brake rotor 75a. The brake torque is delivered to the left front wheel 1a through the third power transmission mechanism 69a. Thus, the third friction brake 68a comprises the third brake rotor 75a, the third brake stator 77a, and the coil 78a. Accordingly, the third friction brake 68a also serves as the "third brake device" of the embodiment, and in the following explanation, the coil 78a will also be called the "third frictional actuator" 78a.

A movable plate 79a is splined to an inner surface of the casing 76 to rotate to be opposed to the third brake stator 77a on the opposite side of the third brake rotor 75a, while being allowed to reciprocate in an axial direction but restricted. A third EPB 82a comprises a third feed screw mechanism 80a and a third brake motor 81a. A structure and an action of the third EPB 82a are similar to those of the first EPB 18, and hence detailed explanations therefore will be omitted. Accordingly, the third brake rotor 75a serves as a "third rotary member", and the third EPB 82a also serves as the "third brake device" and a "third parking mechanism". Here, the third EPB 82a may be adapted to stop a rotation of any of the rotary members of the third power transmission mechanism 69a. In the following explanation, the third brake motor 81a will also be called the "third EPB actuator" 81a.

The third drive unit 64 and the fourth drive unit 65 are held in the casing 76, and the casing 76 is attached to the vehicle body. That is, the third friction brake 68a, the fourth friction brake 68b, the third EPB 82a, and the fourth EPB 82b serve as an inboard brake. According to the embodiment shown in FIGS. 5 and 6, therefore, an unsprung load of the vehicle Ve may be reduced in comparison with that in the conventional vehicle in which the brake device is attached to each front wheel. For this reason, ride comfort of the vehicle can be improved.

In the vehicle drive system shown in FIG. 6, a torque distribution ratio to the left front wheel 1a and the right front wheel 1b may be controlled by controlling a ratio between output torques of the third drive unit 64 and the fourth drive unit 65.

The vehicle Ve shown in FIG. 5 further comprises a fifth drive unit 83 that delivers a brake torque to the left rear wheel 3a, and a sixth drive unit 84 that delivers a brake torque to the right rear wheel 3b. In the following explanation, "c" is allotted individually to the reference numerals of the elements of the fifth drive unit 83, and "d" is allotted individually to the reference numerals of the sixth drive unit 84.

The drive units 64, 65, 83, and 84 are controlled by a third ECU 85 as a third controller and a fourth ECU 86 as a fourth controller Configurations of the third ECU 85 and the fourth ECU 86 are similar to those of the first ECU 44 and the second ECU 45, and hence detailed explanations therefore will be omitted.

Figure 7:
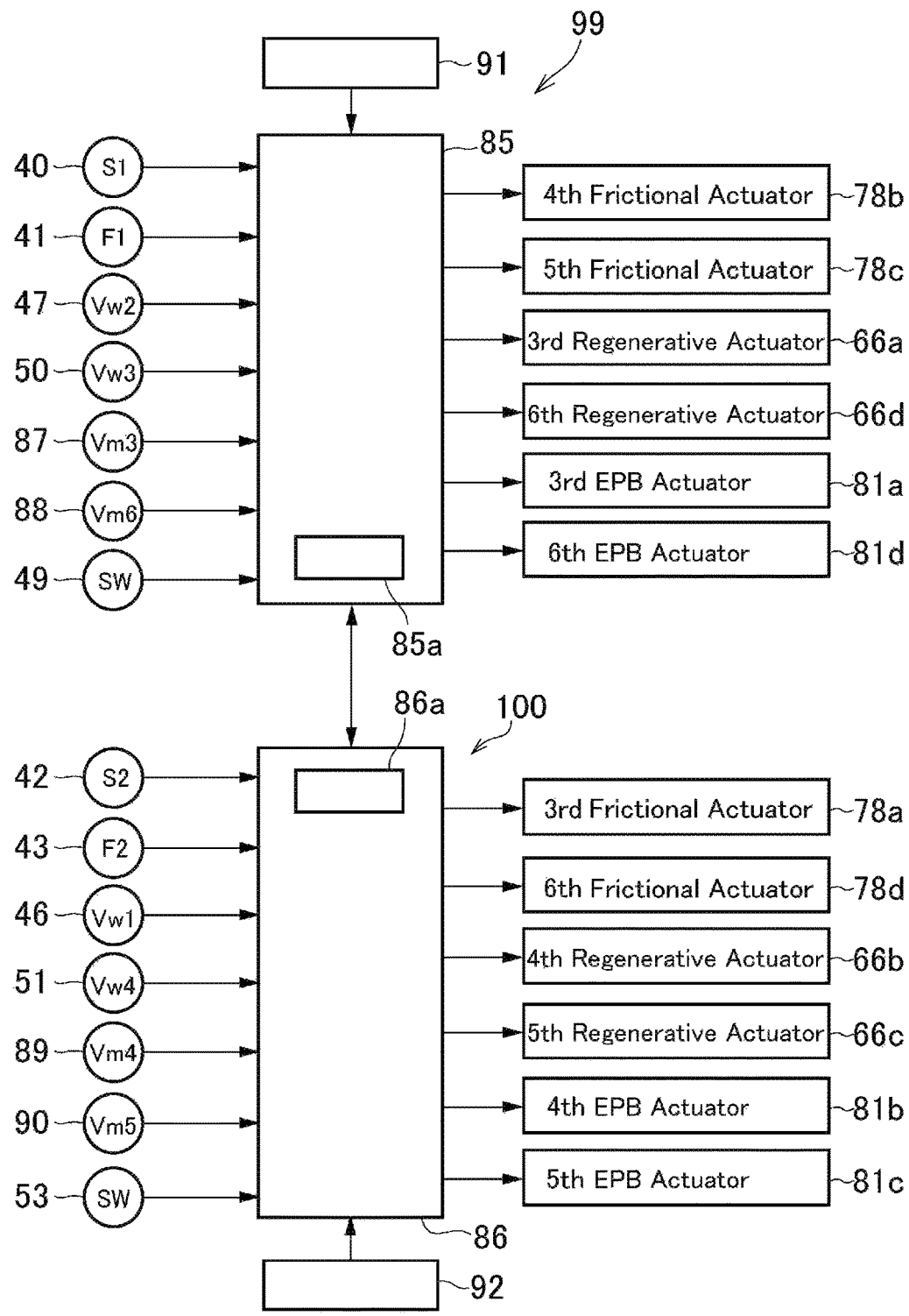
FIG. 7 is a block diagram showing functions of the third ECU and the fourth ECU.

However, as shown in FIGS. 5 and 7, the third ECU 85 and the fourth ECU 86 are connected to the different actuators. In FIG. 5, solid lines represent connections of the third ECU 85, and dashed lines represent connections of the fourth ECU 86.

As shown in FIG. 7, the first stroke sensor 40, the first pedal force sensor 41, the speed sensor 47 that detects a speed of the right front wheel 1b, the speed sensor 50 that detects a speed of the left rear wheel 3a, a motor speed sensor 87 that detects a speed of the drive motor 66a of the third drive unit 64, a motor speed sensor 88 that detects a speed of the drive motor 66d of the sixth drive unit 84, the parking range switch 49 and so on are connected to the third ECU 85. Thus, the third ECU 85 receives data about the stroke of the brake pedal 31 detected by the first stroke sensor 40, data about the pedal force applied to the brake pedal 31 detected by the first pedal force sensor 41, data about the a shift range detected by the parking range switch 49 and so on.

Likewise, the second stroke sensor 42, the second pedal force sensor 43, the speed sensor 46 that detects a speed of the left front wheel 1a, the speed sensor 51 that detects a speed of the right rear wheel 3b, a motor speed sensor 89 that detects a speed of the drive motor 66b of the fourth drive unit 65, a motor speed sensor 90 that detects a speed of the drive motor 66c of the fifth drive unit 83, the parking brake switch 53 and so on are connected to the fourth ECU 86. Thus, the fourth ECU 86 receives data about the stroke of the brake pedal 31 detected by the second stroke sensor 42, data about the pedal force applied to the brake pedal 31 detected by the second pedal force sensor 43 and so on.

The third ECU 85 is also connected to a fourth frictional actuator 78b, a fifth frictional actuator 78c, the third regenerative actuator 66a, a sixth regenerative actuator 66d, a third EPB actuator 81a, and a sixth EPB actuator 81d to transmit command signals to those elements. Likewise, the fourth ECU 86 is also connected to a third frictional actuator 78a, a sixth frictional actuator 78d, a fourth regenerative actuator 66b, a fifth regenerative actuator 66c, a fourth EPB actuator 81b, and a fifth EPB actuator 81c to transmit command signals to those elements.

In order to supply electricity to the third ECU 85, the fourth frictional actuator 78b, the fifth frictional actuator 78c, the third EPB actuator 81a, and the sixth EPB actuator 81d a third power source 91 is connected to the third ECU 85. Likewise, in order to supply electricity to the fourth ECU 86, the third frictional actuator 78a, the sixth frictional actuator 78d, the fourth EPB actuator 81b, and the fifth EPB actuator 81c, a fourth power source 92 is connected to the fourth ECU 86.

The vehicle Ve shown in FIG. 5 is further provided with a third high-voltage power source 93 and a fourth high-voltage power source 94. The third high-voltage power source 93 supplies electricity to the third regenerative actuator 66a and the sixth regenerative actuator 66d, and electricity generated by the third regenerative actuator 66a and the sixth regenerative actuator 66d is accumulated in the third high-voltage power source 93. On the other hand, the fourth high-voltage power source 94 supplies electricity to the fourth regenerative actuator 66b and the fifth regenerative actuator 66c, and electricity generated by the fourth regenerative actuator 66b and the fifth regenerative actuator 66c is accumulated in the fourth high-voltage power source 94. Specifically, the third high-voltage power source 93 is connected to the third regenerative actuator 66a through a third inverter 95, and to the sixth regenerative actuator 66d through a fifth inverter 96. On the other hand, the fourth high-voltage power source 94 is connected to the fourth regenerative actuator 66b through a fourth inverter 97, and to the fifth regenerative actuator 66c through a sixth inverter 98.

The third ECU 85 and the fourth ECU 86 are also connected to each other to exchange the command signal therebetween. When the brake pedal 31 is depressed during propulsion, any one of the third ECU 85 and the fourth ECU 86 calculates brake forces applied to the wheels 1a, 1b, 3a, and 3b based on a pedal force applied to the brake pedal 31 detected by at least one of the first pedal force sensor 41 and the second pedal force sensor 43, and a stroke of the brake pedal 31 detected by at least one of the first stroke sensor 40 and the second stroke sensor 42. Then, said any one of the third ECU 85 and the fourth ECU 86 calculates electric powers to be supplied to the frictional actuators 78a, 78b, 78c, 78d, and the regenerative actuators 66a, 66b, 66c, 66d based on the calculated brake forces. Thereafter, the electric power is supplied to those actuators from the power sources 91, 92 and the high-voltage power sources 93, 94. For example, when it is necessary to differentiate the torque delivered to the left front wheel 1a and the torque delivered to the right front wheel 1b, the electric powers supplied to the third frictional actuator 78a and the fourth frictional actuator 78b are differentiated.

When the parking range switch 49 is turned on to park the vehicle Ve, the electric power is supplied temporarily to the EPB actuators 81a, 81b, 81c, and 81d to engage each of the brake stators 77a, 77b, 77c, and 77d individually with the brake rotors 75a, 75b, 75c, and 75d.

That is, the brake torques applied to the wheels 1a, 1b, 3a, and 3b are established by the cooperation of the third ECU 85 and the fourth ECU 86.

The first pedal force sensor 41, the first stroke sensor 40, the third ECU 85, the third power source 91, the third high-voltage power source 93, the fourth frictional actuator 78b, the fifth frictional actuator 78c, the third regenerative actuator 66a, the sixth regenerative actuator 66d, the third EPB actuator 81a, and the sixth EPB actuator 81d form a third brake system 99. Likewise, the second pedal force sensor 43, the second stroke sensor 42, the fourth ECU 86, the fourth power source 92, the fourth high-voltage power source 94, the third frictional actuator 78a, the sixth frictional actuator 78d, the fourth regenerative actuator 66b, the fifth regenerative actuator 66c, the fourth EPB actuator 81b, and the fifth EPB actuator 81c, form a fourth brake system 100.

Here will be explained a procedure to be carried out in the event of failure in the third brake system 99. In the event of failure of the third brake system 99, an occurrence of failure in the elements of the third brake system 99 is detected by the foregoing procedure carried out to detect a failure in the first brake system 60. To this end, the third ECU 85 is provided with a third detector 85a and the fourth ECU 86 is provided with a fourth detector 86a to detect an occurrence of failure in the third brake system 99 and the fourth brake system 100. In this case, the fourth ECU 86 calculates a required brake force based on the signals transmitted from the second pedal force sensor 43 and the second stroke sensor 42, and then calculates electric powers supplied to the third frictional actuator 78a, the sixth frictional actuator 78d, the fourth regenerative actuator 66b, and the fifth regenerative actuator 66c based on the calculated required brake force. Thereafter, the calculated electric powers are supplied to the third frictional actuator 78a, the sixth frictional actuator 78d, the fourth regenerative actuator 66b, and the fifth regenerative actuator 66c from the fourth power source 92 and the fourth high-voltage power source 94.

In this case, the electric power may also be supplied to the fourth EPB actuator 81b instead of the fourth regenerative actuator 66b. Instead, the electric power may also be supplied to the fourth regenerative actuator 66b and the fourth EPB actuator 81b. Further, the electric power may also be supplied to the fifth EPB actuator 81c instead of the fifth regenerative actuator 66c. Instead, the electric power may also be supplied to fifth EPB actuator 81c and the fifth regenerative actuator 66c. This is because the EPB 82 serves as a backup of the friction brake 68.

When the third frictional actuator 78a, the sixth frictional actuator 78d, the fourth regenerative actuator 66b, the fifth regenerative actuator 66c are energized, the brake torque is applied individually to the front wheels 1a and 1b, and the rear wheels 3a and 3b. In this situation, a torque ratio between the left front wheel 1a and the right front wheel 1b, and a torque ratio between the left rear wheel 3a and the right rear wheel 3b can be controlled in accordance with control amounts of the above-mentioned actuators 78a, 78d, 66b, and 66c.

Thus, in the vehicle drive system shown in FIGS. 5 to 7, the fourth drive unit 65 that applies the brake torque to the right front wheel 1b, the fifth drive unit 83 that applies the brake torque to the left wheel 3a, the third drive unit 64 that applies the brake torque to the left front wheel 1a, and the sixth drive unit 84 that applies the brake torque to the right rear wheel 3b are controlled by the separate brake systems 99 and 100. For example, in the event of failure of the third brake system 99 in the vehicle Ve shown in FIG. 5, the fourth brake system 100 actuates the third frictional actuator 78a to apply the brake torque to the left front wheel 1a, and actuates the sixth frictional actuator 78d to apply the brake torque to the right rear wheel 3b. That is, the brake torques are applied to the diagonal pair of wheels 1a and 3b or 1b and 3a. For this reason, the brake force applied to the vehicle Ve can be ensured even in the event of failure of one of the brake systems while preventing a reduction in the running stability resulting from yawing caused by applying the brake torques to the diagonal pair of wheels.

In addition, the above-explained advantages can be achieved by a drive unit having only one of the friction brake 68, the drive motor 66, and the EPB 82. In other words, the "first brake device" and the "second brake device" do not have to have all of the friction brake 68, the drive motor 66, and the EPB 82.

As described, the fourth ECU 86 is connected to the fourth regenerative actuator 66b and the fifth regenerative actuator 66c so that the brake torque can be applied individually to the left front wheel 1a and the right front wheel 1b, and the left rear wheel 3a and the right rear wheel 3b. In the vehicle Ve shown in FIG. 5, therefore, greater brake torque can be established in comparison with that of the case in which the brake torque is applied only to the left front wheel 1a and the right rear wheel 3b. For this reason, a brake force required by the driver can be achieved certainly.

Figure 8:
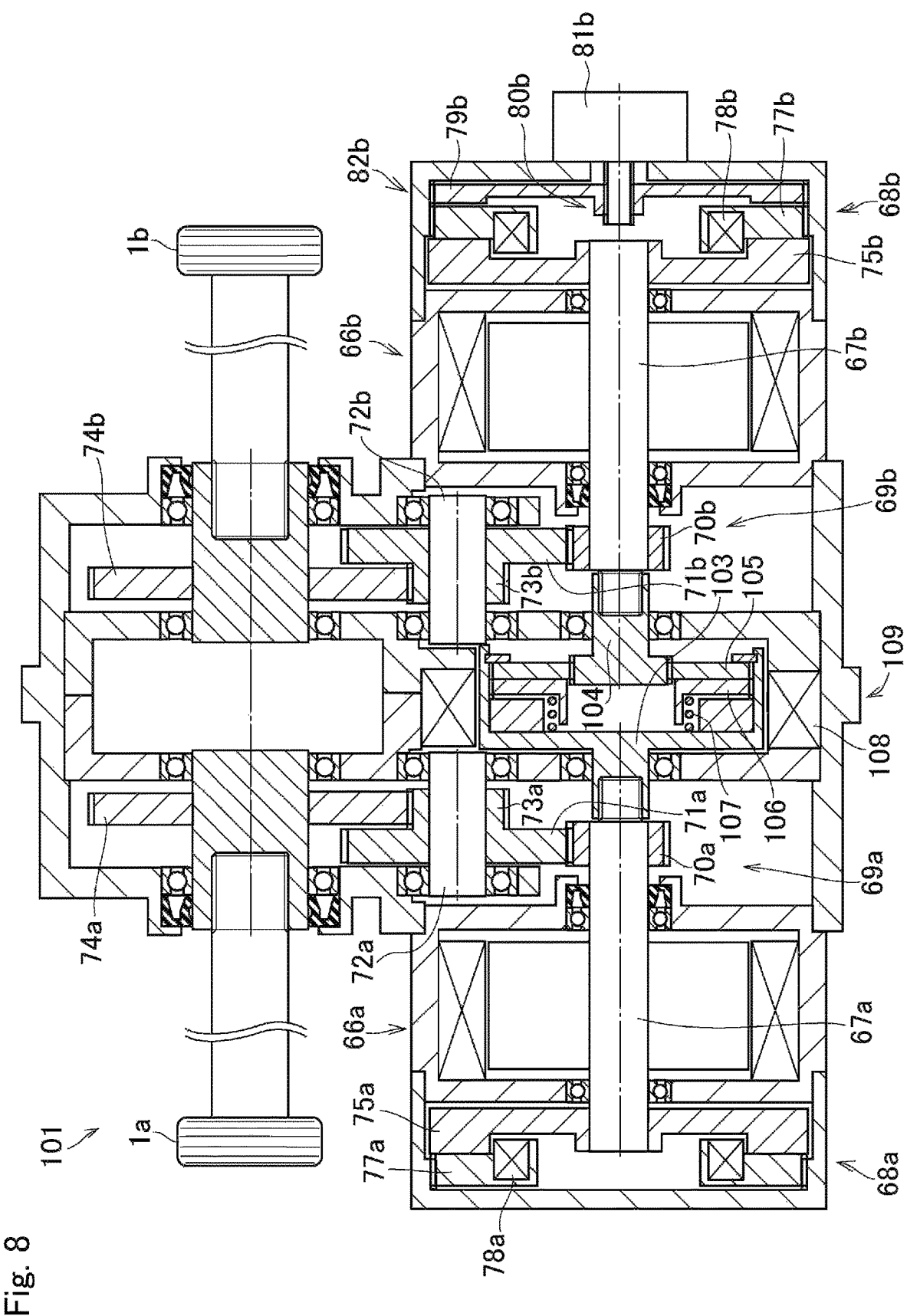
FIG. 8 is a cross-sectional view showing a cross-section of the seventh drive unit.

In order to equalize the torques of the left wheel and the right during propulsion along a straight line, an accurate control of the torques is required in the vehicle Ve shown in FIG. 5. An accuracy of such control can be reduced by mechanically connecting the output shaft 67a of the third drive motor 66a to the output shaft 67b of the fourth drive motor 66b, and mechanically connecting the output shaft 67c of the fifth drive motor 66c to the output shaft 67d of the sixth drive motor 66d. An example of the drive unit having such structure is shown in FIG. 8. Here, a structure of a seventh drive unit 101 in which the output shaft 67a of the third drive motor 66a and the output shaft 67b of the fourth drive motor 66b can be mechanically connected to each other, and an eighth drive unit 102 in which the output shaft 67c of the fifth drive motor 66c and the output shaft 67d of the sixth drive motor 66d can be mechanically connected to each other are similar to each other. In the following explanation, the structure of the seventh drive unit 101 will be explained with reference to FIG. 8.

The seventh drive unit 101 is formed by combining the third drive unit 64 with the fourth drive unit 65. Accordingly, detailed explanations for the common elements will be omitted by allotting common reference numerals thereto. In the seventh drive unit 101, a bottomed-cylindrical clutch cover 103 is connected to a laterally inner end of the output shaft 67a of the third drive motor 66a.

A diametrically smaller portion of an extension shaft 104 is connected to a laterally inner end of the output shaft 67b of the fourth drive motor 66b, and an annular clutch disc 105 is fitted onto a diametrically larger portion of the extension shaft 104. The clutch disc 105 is held in the clutch cover 103 while being allowed to rotate relatively therein.

In the clutch cover 103, an annular pressure plate 106 is splined to an inner surface of a cylindrical portion while being opposed to the clutch disc 105, in such a manner as to reciprocate in an axial direction but restricted to rotate within the clutch cover 103. The pressure plate 106 is pushed by a spring 107 toward the clutch disc 105, and a coil 108 is formed around the clutch cover 103. The coil 108 establishes an electromagnetic force when energized to isolate the pressure plate 106 away from the clutch disc 105. In the seventh drive unit 101, accordingly, the clutch disc 105, the clutch cover 103, the pressure plate 106, the spring 107, and the coil 108 form a seventh differential restricting mechanism 109.

When rotating the left front wheel 1a and the right front wheel 1b at same speeds or by same torques, the pressure plate 106 is engaged with the clutch disc 105 without energizing the coil 108. By contrast, when rotating the left front wheel 1a and the right front wheel 1b at different speeds or by different torques, an electric power supplied to the coil 108 is controlled in such a manner as to achieve a desired torque transmitting capacity between the pressure plate 106 and the clutch disc 105. Thus, the coil 108 serves as an actuator of the seventh differential restricting mechanism 109. In the following explanation, accordingly, the coil 108 will also be called the "clutch actuator" 108.

As described, in the seventh differential restricting mechanism 109, the pressure plate 106 is engaged with the clutch disc 105 when the coil 108 is not energized. In this situation, in the fourth EPB 82b, an engagement between the fourth brake stator 77b and the fourth brake rotor 75b can be maintained by stopping current supply to the fourth brake motor 81b. Thus, in the seventh drive unit 101, the output shaft 67a of the third drive motor 66a can be halted when the vehicle Ve is parked without the third brake motor 81a.

During propulsion along the straight line, in the seventh drive unit 101, the pressure plate 106 is engaged with the clutch disc 105 without energizing the clutch actuator 108, and the drive force is generated by at least one of the drive motors 66a, 66b. In the seventh drive unit 101, therefore, the left front wheel 1a and the right front wheel 1b can be rotated at the same speeds by the same torques. In this case, the clutch actuator 108 is controlled during propulsion and during braking. However, during braking, the friction brakes 68a, 68b are controlled instead of the drive motors 66a, 66b, or in addition to the drive motors 66a, 66b.

When rotating the left front wheel 1a and the right front wheel 1b at different speeds or by different torques during turning, the clutch actuator 108 is energized to cause a relative rotation between the pressure plate 106 and the clutch disc 105 while generating the drive force by at least one of the drive motors 66a, 66b. In this case, the clutch actuator 108 is controlled during propulsion and during braking. However, during braking, the friction brakes 68a, 68b are controlled instead of the drive motors 66a, 66b, or in addition to the drive motors 66a, 66b.

Figure 9:
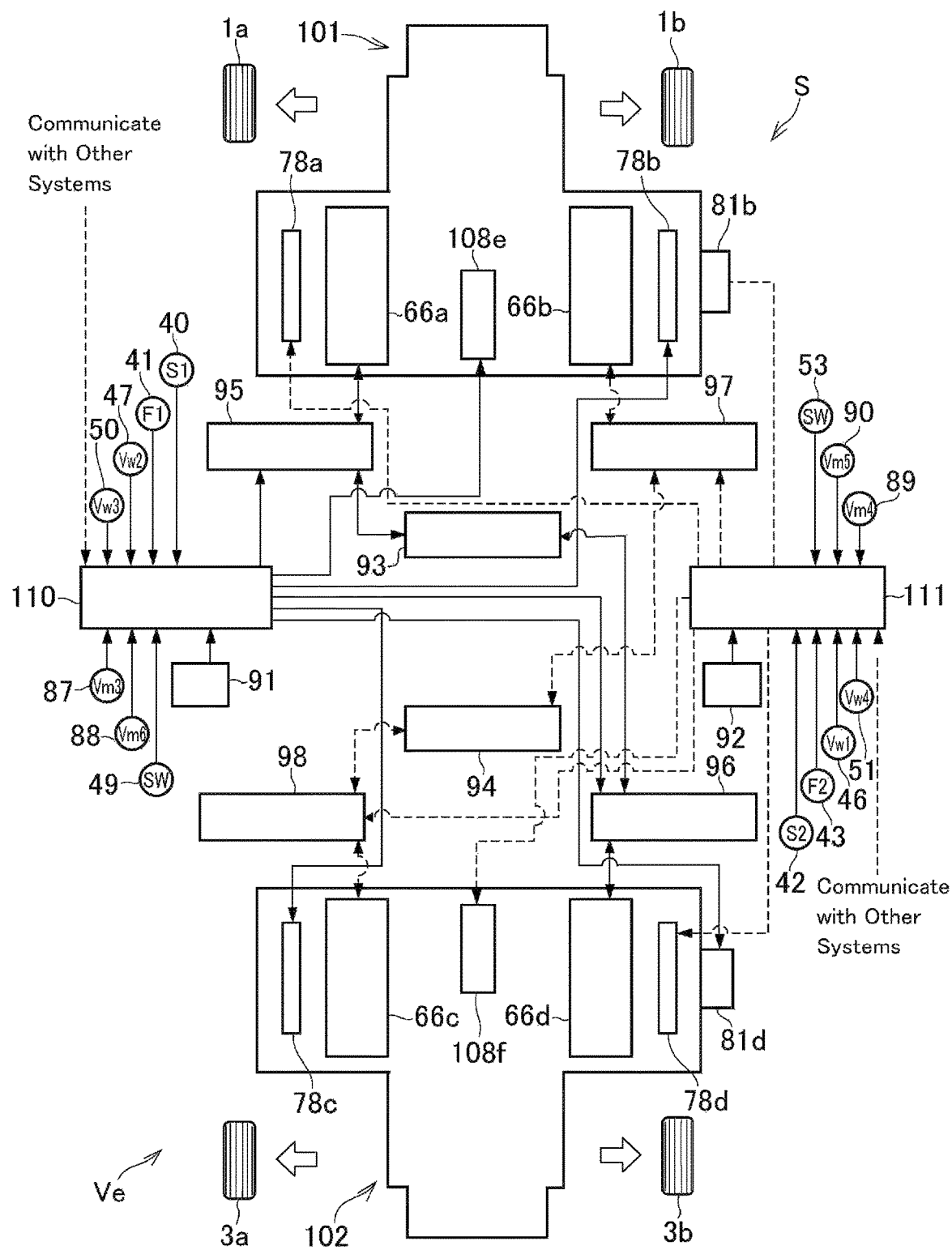
FIG. 9 is a schematic illustration showing still another example of a structure of the vehicle drive system according to the embodiment of the present disclosure.

The vehicle Ve provided with the seventh drive unit 101 and the eighth drive unit 102 that applied a brake torque to the rear wheels 3a and 3b is shown in FIG. 9. The eighth drive unit 102 also comprises an eighth differential restricting mechanism 109f having a same structure as the seventh differential restricting mechanism 109e of the seventh drive unit 101, and the remaining structure of the eighth drive unit 102 is similar to those of the fifth drive unit 83 and the sixth drive unit 84. In the following explanation, common reference numerals are allotted to the elements in common with those of the fifth drive unit 83 and the sixth drive unit 84. In addition, "e" is allotted individually to the reference numerals of the elements of the seventh drive unit 101, and "f" is allotted individually to the reference numerals of the eighth drive unit 102. In the vehicle Ve shown in FIG. 9, the seventh differential restricting mechanism 109e serves as the "third differential restricting mechanism", and the eighth differential restricting mechanism 109f serves as the "fourth differential restricting mechanism".

The drive units 101 and 102 are controlled by a fifth ECU 110 and a sixth ECU 111. Configurations of the fifth ECU 110 and the sixth ECU 111 are similar to those of the first ECU 44, the second ECU 45, the third ECU 85 and the fourth ECU 86, and hence detailed explanations therefore will be omitted.

Figure 10:
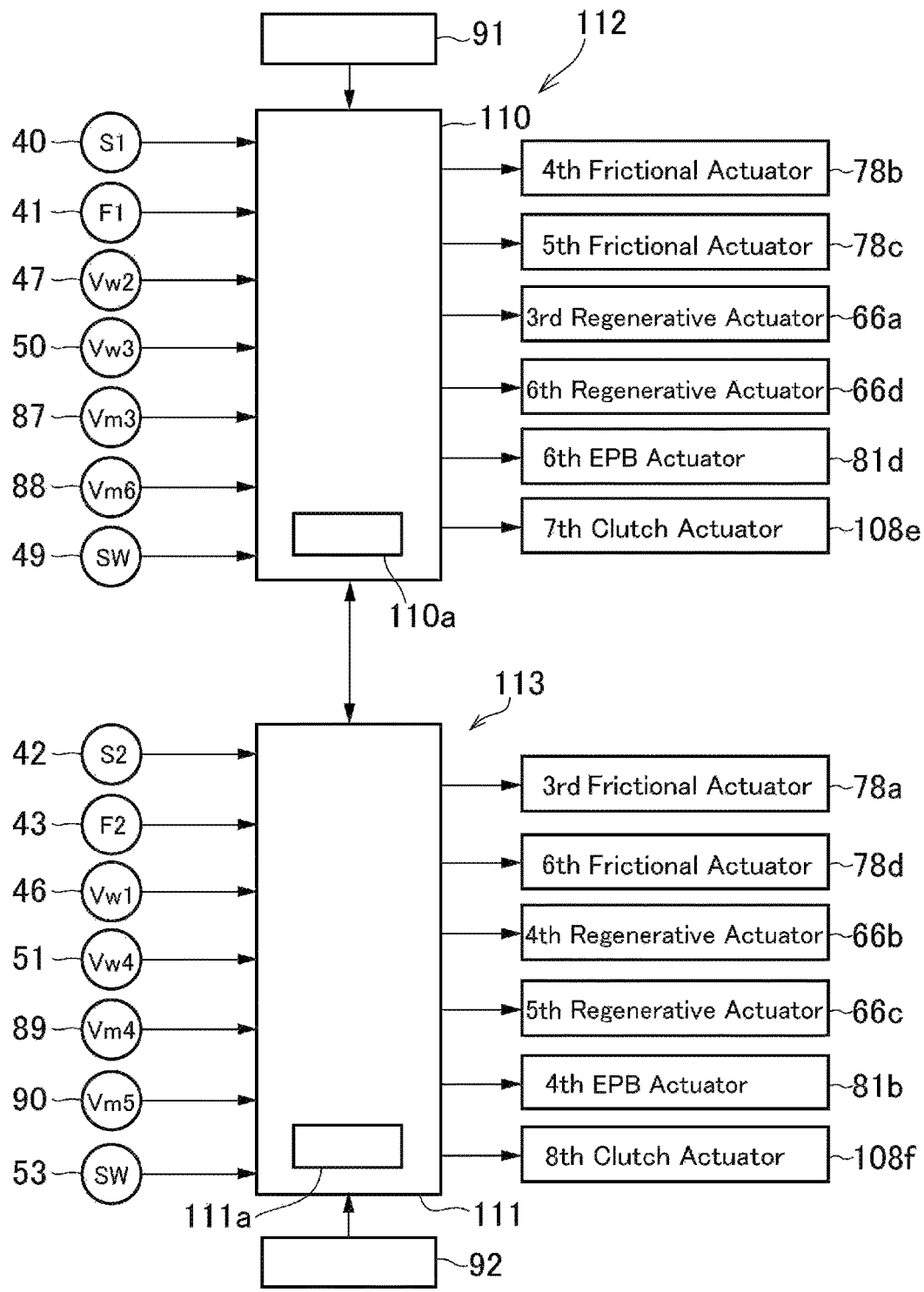
FIG. 10 is a block diagram showing functions of the fifth ECU and the sixth ECU.

In FIG. 9, solid lines represent connections of the fifth ECU 110, and dashed lines represent connections of the sixth ECU 111. As shown in FIG. 9, the fifth ECU 110 is connected to the seventh clutch actuator 108e instead of the third EPB actuator 81a, and to the eighth clutch actuator 108f instead of the fifth EPB actuator 81c. As shown in FIGS. 9 and 10, same signals as the signals transmitted to the third ECU 85 are also transmitted to the fifth ECU 110, and same signals as the signals transmitted to the fourth ECU 86 are also transmitted to the sixth ECU 111.

The fifth ECU 110 and the sixth ECU 111 are also connected to each other to exchange the command signal therebetween. When the brake pedal 31 is depressed during propulsion, any one of the fifth ECU 110 and the sixth ECU 111 calculates brake forces applied to the wheels 1a, 1b, 3a, and 3b based on a pedal force applied to the brake pedal 31 detected by at least one of the first pedal force sensor 41 and the second pedal force sensor 43, and a stroke of the brake pedal 31 detected by at least one of the first stroke sensor 40 and the second stroke sensor 42. Then, said any one of the fifth ECU 110 and the sixth ECU 111 calculates electric powers to be supplied to the frictional actuators 78a, 78b, 78c, 78d, and the regenerative actuators 66a, 66b, 66c, 66d based on the calculated brake forces. Thereafter, the electric power is supplied to those actuators from the power sources 91, 92 and the high-voltage power sources 93, 94. For example, when it is necessary to differentiate the torque delivered to the left front wheel 1a and the torque delivered to the right front wheel 1b, the electric powers supplied to the seventh frictional actuator 108e and the eighth frictional actuator 108f are differentiated.

When the parking range switch 49 is turned on to park the vehicle Ve, the electric power is supplied temporarily to the EPB actuators 81b and 81d to engage each of the brake stators 77b and 77d individually with the brake rotors 75b and 75d in the drive units 101 and 102.

That is, the brake torques applied to the wheels 1a, 1b, 3a, and 3b are established by the cooperation of the fifth ECU 110 and the sixth ECU 111.

The first pedal force sensor 41, the first stroke sensor 40, the fifth ECU 110, the third power source 91, the third high-voltage power source 93, the fourth frictional actuator 78b, the fifth frictional actuator 78c, the third regenerative actuator 66a, the sixth regenerative actuator 66d, the sixth EPB actuator 81d, and the seventh clutch actuator 108e form a fifth brake system 112. Likewise, the second pedal force sensor 43, the second stroke sensor 42, the sixth ECU 111, the fourth power source 92, the fourth high-voltage power source 94, the third frictional actuator 78a, the sixth frictional actuator 78d, the fourth regenerative actuator 66b, the fifth regenerative actuator 66c, the fourth EPB actuator 81b, and the eighth clutch actuator 108f, form a sixth brake system 113.

Here will be explained a procedure to be carried out in the event of failure in the fifth brake system 112. In the event of failure of the fifth brake system 112, an occurrence of failure in the elements of the fifth brake system 112 is detected by the foregoing procedure carried out to detect a failure in the first brake system 60. To this end, the fifth ECU 110 is provided with a fifth detector 110*a* and the sixth ECU 111 is provided with a sixth detector 111*a* to detect an occurrence of failure in the fifth brake system 112 and the sixth brake system 113. In this case, the sixth ECU 111 calculates a required brake force based on the signals transmitted from the second pedal force sensor 43 and the second stroke sensor 42, and then calculates electric powers supplied to the third frictional actuator 78*a*, the sixth frictional actuator 78*d*, the fourth regenerative actuator 66*b*, and the fifth regenerative actuator 66*c* based on the calculated required brake force. Thereafter the calculated electric powers are supplied to the third frictional actuator 78*a*, the sixth frictional actuator 78*d*, the fourth regenerative actuator 66*b*, and the fifth regenerative actuator 66*c* from the fourth power source 92 and the fourth high-voltage power source 94.

In this case, the electric power may also be supplied to the fourth EPB actuator 81*b* instead of the fourth regenerative actuator 66*b*. Instead, the electric power may also be supplied to the fourth regenerative actuator 66*b* and the fourth EPB actuator 81*b*. This is because the EPB 82 serves as a backup of the friction brake 68. In order to use the EPB 82 as a backup of the friction brake 68, it is preferable to control the fourth EPB actuator 81*b* by the ECU other than the ECU controlling the fourth frictional actuator 78*b*.

When differentiating the brake forces applied to the right wheel and the left wheel, the torque transmitting capacity between the eighth pressure plate 106*f* and the eighth clutch disc 105*f* is reduced by controlling the current supply to the eighth clutch actuator 108*f*, while controlling an output torque of the fifth regenerative actuator 66*c* and a brake torque of the sixth frictional actuator 78*d*.

By thus energizing the third frictional actuator 78*a*, the sixth frictional actuator 78*d*, the fourth regenerative actuator 66*b*, and the fifth regenerative actuator 66*c*, the brake torque can be applied individually to the front wheels 1*a* and 1*b* and the rear wheel 3*a* and 3*b*. In addition, the brake forces applied to the right wheel and the left wheel can be differentiated by controlling the eighth clutch actuator 108*f*.

Thus, in the vehicle drive system shown in FIGS. 8 to 10, the left front wheel 1*a* and the right front wheel 1*b* are drive by the seventh drive unit 101, and the left rear wheel 3*a* and the right rear wheel 3*b* are driven by the eighth drive unit 102. For example, in the event of failure of the fifth brake system 112 in the vehicle Ve shown in FIG. 9, the sixth brake system 113 actuates the third frictional actuator 78*a* to apply the brake torque to the left front wheel 1*a*, and actuates the sixth frictional actuator 78*d* to apply the brake torque to the right rear wheel 3*b*. That is, the brake torques are applied to the diagonal pair of wheels 1*a* and 3*b* or 1*b* and 3*a*. For this reason, the brake force applied to the vehicle Ve can be ensured even in the event of failure of one of the brake systems while preventing a reduction in the running stability resulting from yawing caused by applying the brake torques to the diagonal pair of wheels.

In addition, the above-explained advantages can be achieved by a drive unit having only one of the friction brake 68, the drive motor 66, and the EPB 82. In other words, the "first brake device" and the "second brake device" do not have to have all of the friction brake 68, the drive motor 66, and the EPB 82.

As described, the sixth ECU 111 is connected to the fourth regenerative actuator 66*b* and the fifth regenerative actuator 66*c* so that the brake torque can be applied individually to the left front wheel 1*a* and the right front wheel 1*b*, and the left rear wheel 3*a* and the right rear wheel 3*b*. In the vehicle Ve shown in FIG. 9, therefore, greater brake torque can be established in comparison with that of the case in which the brake torque is applied only to the left front wheel 1*a* and the right rear wheel 3*b*. For this reason, a brake force required by the driver can be achieved certainly.

The foregoing drive system S may further comprise an additional ECU to observe an occurrence of failure of any of the aforementioned ECUs. In this case, information about the failure of one of the ECUs is transmitted from the additional ECT to another ECU working properly, and the occurrence of failure is determined by the detector of the ECU working properly.

The vehicle drive system according to the embodiment may also be applied to an autonomous vehicle without having the pedal mechanism. In this case, the ECUs may also receive the signals from a RADAR and a LASER for detecting an external condition. The autonomous vehicle may be propelled in a limp home mode in the event of failure of any one of the ECU.

What is claimed is:

1. A vehicle drive system comprising:
   a first front brake device and a second front brake device that apply a brake torque to a pair of front wheels;
   a first rear brake device and a second rear brake device that apply a brake torque to a pair of rear wheels;
   a first controller that is configured to control the brake torque generated by the first front brake device and the second rear brake device;
   a second controller that is configured to control the brake torque generated by the second front brake device and the first rear brake device;
   a first brake system including the first controller, the first front brake device, and the second rear brake device;
   a second brake system including the second controller, the second front brake device, and the first rear brake device; and
   a detector that detects an occurrence of failure in the first brake system and the second brake system, such that (i) in response to the detector detecting the occurrence of failure in the first brake system, the second controller of the second brake system controls the second front brake device and the first rear brake device to apply the brake torque to the pair of front wheels and the pair of rear wheels, and (ii) in response to the detector detecting the occurrence of failure in the second brake system, the first controller of the first brake system controls the first front brake device and the second rear brake device to apply the brake torque to the pair of front wheels and the pair of rear wheels.

2. The vehicle drive system as claimed in claim 1, further comprising:
   a first brake rotor that is connected to the pair of front wheels;
   a first friction brake that is brought into frictional contact with the first brake rotor to apply a brake torque to the first brake rotor;
   a second brake rotor that is connected to the pair of rear wheels; and
   a second friction brake that is brought into frictional contact with the second brake rotor to apply a brake torque to the second brake rotor, wherein the first front brake device includes the first friction brake, and the first rear brake device includes the second friction brake.

3. The vehicle drive system as claimed in claim 1, further comprising:
a first rotor shaft that is connected to the pair of front wheels;
a first generator that translates a power generated by a rotation of the first rotor shaft into an electric power;
a second rotor shaft that is connected to the pair of rear wheels; and
a second generator that translates a power generated by a rotation of the second rotor shaft into an electric power,
wherein the second front brake device includes the first generator, and the second rear brake device includes the second generator.

4. The vehicle drive system as claimed in claim 1, further comprising:
a first rotary member that is connected to the pair of front wheels;
a first parking mechanism that applies a brake torque to the first rotary member to park a vehicle;
a second rotary member that is connected to the pair of rear wheels; and
a second parking mechanism that applies a brake torque to the second rotary member to park the vehicle,
wherein the second front brake device includes the first parking mechanism, and the second rear brake device includes the second parking mechanism.

5. The vehicle drive system as claimed in claim 1, further comprising:
a first differential restricting mechanism that changes a ratio between a torque delivered from the first front brake device and the second front brake device to a first front wheel of the pair of front wheels, and a torque delivered from the first front brake device and the second front brake device to a second front wheel of the pair of front wheels; and
a second differential restricting mechanism that changes a ratio between a torque delivered from the first rear brake device and the second rear brake device to a first rear wheel of the pair of rear wheels, and a torque delivered from the first rear brake device and the second rear brake device to a second rear wheel of the pair of rear wheels,
wherein the first controller is further configured to control any one of the first differential restricting mechanism and the second differential restricting mechanism, and the second controller is further configured to control other one of the first differential restricting mechanism and the second differential restricting mechanism.

6. A vehicle drive system comprising:
a third brake device that applies a brake torque to a left front wheel;
a fourth brake device that applies a brake torque to a right front wheel;
a fifth brake device that applies a brake torque to a left rear wheel;
a sixth brake device that applies a brake torque to a right rear wheel;
a third controller that is configured to control each of the brake torque generated by the fourth brake device and the brake torque generated by the fifth brake device;
a fourth controller that is configured to control each of the brake torque generated by the third brake device and the brake torque generated by the sixth brake device;
a third brake system including the third controller, the fourth brake device, and the fifth brake device;
a fourth brake system including the fourth controller, the third brake device, and the sixth brake device; and
a detector that detects an occurrence of failure in the third brake system and the fourth brake system, such that (i) in response to the detector detecting the occurrence of failure in the third brake system, the fourth controller of the fourth brake system controls the fourth brake device to apply the brake torque to the pair of rear wheels, and (ii) in response to the detector detecting the occurrence of failure in the fourth brake system, the third controller of the third brake system controls the third brake device to apply the brake torque to the pair of front wheels.

7. The vehicle drive system as claimed in claim 6, further comprising:
a third brake rotor that is connected to the left front wheel;
a fourth brake rotor that is connected to the right front wheel;
a fifth brake rotor that is connected to the left rear wheel;
a sixth brake rotor that is connected to the right rear wheel;
a third friction brake that is brought into frictional contact with the third brake rotor to apply a brake torque to the third brake rotor;
a fourth friction brake that is brought into frictional contact with the fourth brake rotor to apply a brake torque to the fourth brake rotor;
a fifth friction brake that is brought into frictional contact to the fifth brake rotor to apply a brake torque to the fifth brake rotor; and
a sixth friction brake that is brought into frictional contact to the sixth brake rotor to apply a brake torque to the sixth brake rotor, wherein:
the third brake device includes the third friction brake,
the fourth brake device includes the fourth friction brake,
the fifth brake device includes the fifth friction brake, and
the sixth brake device includes the sixth friction brake.

8. The vehicle drive system as claimed in claim 6, further comprising:
a third rotor shaft that is connected to the left front wheel;
a fourth rotor shaft that is connected to the right front wheel;
a fifth rotor shaft that is connected to the left rear wheel;
a sixth rotor shaft that is connected to the right rear wheel;
a third generator that translates a power generated by a rotation of the third rotor shaft into an electric power;
a fourth generator that translates a power generated by a rotation of the fourth rotor shaft into an electric power;
a fifth generator that translates a power generated by a rotation of the fifth rotor shaft into an electric power; and
a sixth generator that translates a power generated by a rotation of the sixth rotor shaft into an electric power, wherein
the third brake device includes the third generator,
the fourth brake device includes the fourth generator,
the fifth brake device includes the fifth generator, and
the sixth brake device includes the sixth generator.

9. The vehicle drive system as claimed in claim 6, further comprising:
a third rotary member that is connected to the left front wheel;
a fourth rotary member that is connected to the right front wheel;

a fifth rotary member that is connected to the left rear wheel;
a sixth rotary member that is connected to the right rear wheel;
a third parking mechanism that applies a brake torque to the third rotary member to park a vehicle;
a fourth parking mechanism that applies a brake torque to the fourth rotary member to park the vehicle;
a fifth parking mechanism that applies a brake torque to the fifth rotary member to park the vehicle; and
a sixth parking mechanism that applies a brake torque to the sixth rotary member to park the vehicle, wherein
the third brake device includes the third parking mechanism,
the fourth brake device includes the fourth parking mechanism,
the fifth brake device includes the fifth parking mechanism, and
the sixth brake device includes the sixth parking mechanism.

10. The vehicle drive system as claimed in claim 7, further comprising:
a third rotor shaft that is connected to the left front wheel;
a fourth rotor shaft that is connected to the right front wheel;
a fifth rotor shaft that is connected to the left rear wheel;
a sixth rotor shaft that is connected to the right rear wheel;
a third generator that translates a power generated by a rotation of the third rotor shaft into an electric power;
a fourth generator that translates a power generated by a rotation of the fourth rotor shaft into an electric power;
a fifth generator that translates a power generated by a rotation of the fifth rotor shaft into an electric power; and
a sixth generator that translates a power generated by a rotation of the sixth rotor shaft into an electric power, wherein
the third controller is further configured to control the third generator and the sixth generator, and
the fourth controller is further configured to control the fourth generator and the fifth generator.

11. The vehicle drive system as claimed in claim 7, further comprising:
a third rotary member that is connected to the left front wheel;
a fourth rotary member that is connected to the right front wheel;
a fifth rotary member that is connected to the left rear wheel;
a sixth rotary member that is connected to the right rear wheel;
a third parking mechanism that applies a brake torque to the third rotary member to park a vehicle while controlling a magnitude of the brake torque;
a fourth parking mechanism that applies a brake torque to the fourth rotary member to park the vehicle while controlling a magnitude of the brake torque;
a fifth parking mechanism that applies a brake torque to the fifth rotary member to park the vehicle while controlling a magnitude of the brake torque; and
a sixth parking mechanism that applies a brake torque to the sixth rotary member to park the vehicle while controlling a magnitude of the brake torque, wherein
the third controller is further configured to control the third parking mechanism and the sixth parking mechanism, and
the fourth controller is further configured to control the fourth parking mechanism and the fifth parking mechanism.

12. The vehicle drive system as claimed in claim 6, further comprising:
a third differential restricting mechanism that controls torque transmitting capacities of the third brake device and the fourth brake device; and
a fourth differential restricting mechanism that controls torque transmitting capacities of the fifth brake device and the sixth brake device, wherein
the third controller is configured to control the torque transmitting capacity of the third differential restricting mechanism, and
the fourth controller is configured to control the torque transmitting capacity of the fourth differential restricting mechanism.

13. The vehicle drive system as claimed in claim 7, further comprising:
a third differential restricting mechanism that controls torque transmitting capacities of the third brake device and the fourth brake device; and
a fourth differential restricting mechanism that controls torque transmitting capacities of the fifth brake device and the sixth brake device, wherein
the third controller is configured to control the torque transmitting capacity of the third differential restricting mechanism, and
the fourth controller is configured to control the torque transmitting capacity of the fourth differential restricting mechanism.

14. The vehicle drive system as claimed in claim 12, further comprising:
a seventh rotary member that is connected to any one of the right front wheel and the left front wheel;
a seventh parking mechanism that applies a brake torque to the seventh rotary member to park the vehicle while controlling a magnitude of the brake torque;
an eighth rotary member that is connected to any one of the right rear wheel and the left rear wheel; and
an eighth parking mechanism that applies a brake torque to the eighth rotary member to park the vehicle while controlling a magnitude of the brake torque, wherein
any one of the third controller and the fourth controller controlling the other one of the right front wheel and the left front wheel controls the seventh parking mechanism, and
any one of the third controller and the fourth controller controlling the other one of the right rear wheel and the left rear wheel controls the eighth parking mechanism.

15. The vehicle drive system as claimed in claim 1, further comprising a first sensor and a second sensor that detect at least any one of a stroke of a brake pedal and a pedal force, wherein:
the first brake system further includes the first sensor;
the second brake system further includes the second sensor;
the first controller is configured to control the brake torque generated by the first front brake device and the second rear brake device based on a signal detected by the first sensor; and
the second controller is configured to control the brake torque generated by the second front brake device and the first rear brake device based on a signal detected by the second sensor.

* * * * *